(12) United States Patent
McKeefery

(10) Patent No.: US 12,581,269 B1
(45) Date of Patent: *Mar. 17, 2026

(54) SYSTEMS AND METHODS FOR EVALUATING MOTION EVENT TYPES USING MACHINE LEARNING

(71) Applicant: NoCell Technologies, LLC, Aliso Viejo, CA (US)

(72) Inventor: Donald McKeefery, Advance, NC (US)

(73) Assignee: NoCell Technologies, LLC, Aliso Viejo, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 18/458,887

(22) Filed: Aug. 30, 2023

Related U.S. Application Data

(63) Continuation of application No. 17/345,383, filed on Jun. 11, 2021, now Pat. No. 11,785,418.

(51) Int. Cl.
H04W 4/02 (2018.01)
G08B 21/02 (2006.01)
H04W 48/04 (2009.01)

(52) U.S. Cl.
CPC ............ H04W 4/027 (2013.01); G08B 21/02 (2013.01); H04W 48/04 (2013.01)

(58) Field of Classification Search
CPC ..... H04W 4/027; H04W 48/04; H04W 4/029; G08B 21/02; G16H 50/20; G06N 20/00; G06N 3/09

(Continued)

(56) References Cited

U.S. PATENT DOCUMENTS 6,714,894 B1    3/2004   Tobey et al.
7,389,178 B2    6/2008   Raz et al.
(Continued)

FOREIGN PATENT DOCUMENTS

WO    WO-2019014184 A1 *   1/2019  .......... G08G 1/0129

OTHER PUBLICATIONS

D. McKeefery et al., "System, Method And Apparatus For Facilitating The Restriction Of The Use Of One Or More Network Devices Through Automated Policy Enforcement," filed Apr. 29, 2019, U.S. Appl. No. 16/398,127 including its prosecution history.
(Continued)

*Primary Examiner* — Mong-Thuy T Tran
(74) *Attorney, Agent, or Firm* — Rutan & Tucker, LLP; Kyle M. St. James

(57) ABSTRACT

A computerized method for identifying a type of a motion event of a network device is disclosed that includes operations of establishing a position baseline of the network device, wherein establishing the position baseline of the network device includes recording a value for each of an X-, Y- and Z-axis detected by a gyroscope of the network device and detecting the motion event of the network device, which includes detecting a position change by the gyroscope or an acceleration by an accelerometer of the network device. Additionally, the method includes operations of evaluating the detected position change or acceleration of the network device by a machine learning model and identifying a type of motion event based on results of the evaluating by the machine learning model. The method may further include the operation of implementing a set of policies on the network device to restrict functionality thereof.

20 Claims, 14 Drawing Sheets

(58) Field of Classification Search
USPC ...................................................... 455/456.6
See application file for complete search history.

(56) References Cited

U.S. PATENT DOCUMENTS

| | | | |
|---|---|---|---|
| 7,561,054 | B2 | 7/2009 | Raz et al. |
| 8,527,013 | B2 | 9/2013 | Guba et al. |
| 8,682,572 | B2 | 3/2014 | Raz et al. |
| 8,706,872 | B2 | 4/2014 | Moussavian et al. |
| 8,718,536 | B2 | 5/2014 | Hannon |
| 8,805,639 | B1 | 8/2014 | Musicant et al. |
| D712,928 | S | 9/2014 | Brener et al. |
| 8,896,465 | B2 | 11/2014 | Raz et al. |
| 8,966,064 | B2 | 2/2015 | Moussavian et al. |
| 8,983,710 | B2 | 3/2015 | Raz et al. |
| 8,994,492 | B2 | 3/2015 | Farhan et al. |
| 9,043,462 | B2 | 5/2015 | Badiee et al. |
| 9,079,494 | B2 | 7/2015 | Skelton |
| 9,185,526 | B2 | 11/2015 | Guba et al. |
| 9,283,931 | B2 | 3/2016 | Skelton |
| 9,338,605 | B2 | 5/2016 | Guba et al. |
| 9,342,983 | B1 | 5/2016 | Brener et al. |
| 9,369,196 | B2 | 6/2016 | Hannon |
| 9,379,805 | B2 | 6/2016 | Hannon |
| 9,398,421 | B2 | 7/2016 | Guba et al. |
| 9,660,923 | B2 | 5/2017 | Badiee et al. |
| 9,692,880 | B2 | 6/2017 | Hannon |
| 9,707,928 | B2 | 7/2017 | Skelton |
| 9,847,948 | B2 | 12/2017 | Badiee et al. |
| 9,854,393 | B2 | 12/2017 | Moussavian et al. |
| 9,854,433 | B2 | 12/2017 | Hannon |
| 9,872,225 | B2 | 1/2018 | Guba et al. |
| 9,887,887 | B2 | 2/2018 | Hunter et al. |
| 9,955,352 | B2 | 4/2018 | Mahaffey et al. |
| 10,025,958 | B1 | 7/2018 | Todasco |
| 10,075,764 | B2 | 9/2018 | Moussavian et al. |
| 10,079,931 | B2 | 9/2018 | Nicholls et al. |
| 10,084,603 | B2 | 9/2018 | Rogers et al. |
| 10,104,063 | B2 | 10/2018 | Hu et al. |
| 10,122,846 | B2 | 11/2018 | Hannon |
| 10,194,017 | B2 | 1/2019 | Skelton |
| 10,205,819 | B2 | 2/2019 | Hannon et al. |
| 10,268,530 | B2 | 4/2019 | Breaux et al. |
| 10,271,265 | B2 | 4/2019 | Breaux, III et al. |
| 10,412,538 | B2 | 9/2019 | Moussavian et al. |
| 10,440,063 | B1 | 10/2019 | Nevick et al. |
| 10,477,454 | B2 | 11/2019 | Breaux et al. |
| 10,547,736 | B2 | 1/2020 | Hannon et al. |
| 10,555,240 | B2 * | 2/2020 | Silver ................. H04W 36/324 |
| 10,649,825 | B2 | 5/2020 | Breaux et al. |
| 10,681,613 | B2 * | 6/2020 | Silver ..................... H04W 4/40 |
| 10,805,861 | B2 | 10/2020 | Breaux, III et al. |
| 10,834,249 | B2 | 11/2020 | Nicholls et al. |
| 10,868,837 | B2 | 12/2020 | Nevick et al. |
| 10,868,838 | B2 | 12/2020 | Nevick et al. |
| 11,330,418 | B2 * | 5/2022 | Nanjappan ........... G08B 21/187 |
| 11,388,649 | B2 * | 7/2022 | Silver ..................... H04W 4/40 |
| 11,582,679 | B2 * | 2/2023 | Silver ..................... H04W 4/90 |
| 11,755,878 | B2 * | 9/2023 | Cella .................. G05B 23/0221 |
| | | | 702/188 |
| 11,785,418 | B1 * | 10/2023 | McKeefery .......... H04W 4/027 |
| | | | 455/456.6 |
| 2011/0009107 | A1 | 1/2011 | Guba et al. |
| 2014/0143064 | A1 | 5/2014 | Tran |
| 2017/0055896 | A1 | 3/2017 | Al-Ali et al. |
| 2018/0213360 | A1 * | 7/2018 | Schmitt .................. G06Q 40/08 |
| 2018/0329765 | A1 * | 11/2018 | Breaux .................. H04W 4/40 |
| 2018/0367665 | A1 * | 12/2018 | Guisti ............... H04M 1/72463 |
| 2019/0220015 | A1 * | 7/2019 | Phillips .................... G05D 1/65 |
| 2020/0137520 | A1 * | 4/2020 | Schmitt .......... H04M 1/724631 |
| 2021/0063179 | A1 * | 3/2021 | Hayes ............... G01C 21/3632 |

OTHER PUBLICATIONS

D. McKeefery et al., "System, Method And Apparatus For Obtaining Sensory Data," filed Feb. 24, 2020, U.S. Appl. No. 16/799,766 including its prosecution history.

D. McKeefery et al., "System, Method And Apparatus For Obtaining Sensory Data," filed May, 9, 2022, U.S. Appl. No. 17/740,270 including its prosecution history.

D. McKeefery et al., "System, Method And Apparatus For Restricting Use Of A Network Device Through Automated Policy Enforcement," filed Apr. 29, 2019, U.S. Appl. No. 16/398,120 including its prosecution history.

D. McKeefery et al., "System, Method And Apparatus For Secondary Network Device Detection," filed Feb. 24, 2020, U.S. Appl. No. 16/799,758 including its prosecution history.

D. McKeefery et al., "System, Method And Apparatus To Maintain Policy Enforcement On A Network Device," filed Feb. 24, 2020, U.S. Appl. No. 16/799,768 including its prosecution history.

D. McKeefery et al., "Systems, Methods, And Apparatus For A Network Device Transceiver," filed March, 9, 2022, U.S. Appl. No. 17/690,807 including its prosecution history.

D. McKeefery, "Detection Of Network Devices Within A Driver Envelope And Implementation Of Policy Thereon," filed Jun. 29, 2023, U.S. Appl. No. 18/216,454 including its prosecution history.

D. McKeefery, "Detection Of The End Of A Network Device Trip," filed Jun. 30, 2023, U.S. Appl. No. 18/216,967 including its prosecution history.

D. McKeefery, "System And Method For Determining A Driver Device From A Plurality Of Network Devices," filed Jun. 11, 2021, U.S. Appl. No. 17/345,389 including its prosecution history.

D. McKeefery, "System And Method For Determining Network Device Handling," filed Jun. 11, 2021, U.S. Appl. No. 17/345,383 including its prosecution history.

D. McKeefery, "System And Method For Rapid Release Of Policy Implemented On A Mobile Device," filed Jun. 11, 2021, U.S. Appl. No. 17/345,385 including its prosecution history.

D. McKeefery, "System And Method For Release Of Policy Implemented On A Mobile Device Whilein Motion," filed Aug. 2, 2023, U.S. Appl. No. 18/364,398 including its prosecution history.

D. McKeefery, "Systems And Methods For Detection Of Failure To Establish A Communicative Coupling Between Network Device And Transceiver Device," filed May 31, 2023, U.S. Appl. No. 18/204,235 including its prosecution history.

D. McKeefery, "Systems And Methods For Determining A Wireless Communications Module Of A Network Device Has Been Disabled," filed Sep. 1, 2021, U.S. Appl. No. 17/464,179 including its prosecution history.

D. Swartz et al., "System, Method And Apparatus For Generating A Zone Restricting Use Of A Mobile Device," filed Jun. 6, 2017, U.S. Appl. No. 15/615,745 including its prosecution history.

D. Swartz et al., "System, Method And Apparatus For Generating A Zone Restricting Use Of A Mobile Device," filed Mar. 28, 2018, U.S. Appl. No. 15/939,147 including its prosecution history.

Motion Intelligence, "How Motion Intelligence's Solution Works" https://vimeo.com/448673163, last accessed Jan. 20, 2022.

Motion Intelligence, "Why Motion Intelligence" https://vimeo.com/448671482, last accessed Jan. 20, 2022.

PCT/US2022/033049 filed Jun. 10, 2022 International Search Report and Written Opinion dated Oct. 13, 2022.

* cited by examiner

POLICY ENFORCEMENT SERVER SYSTEM
-102-

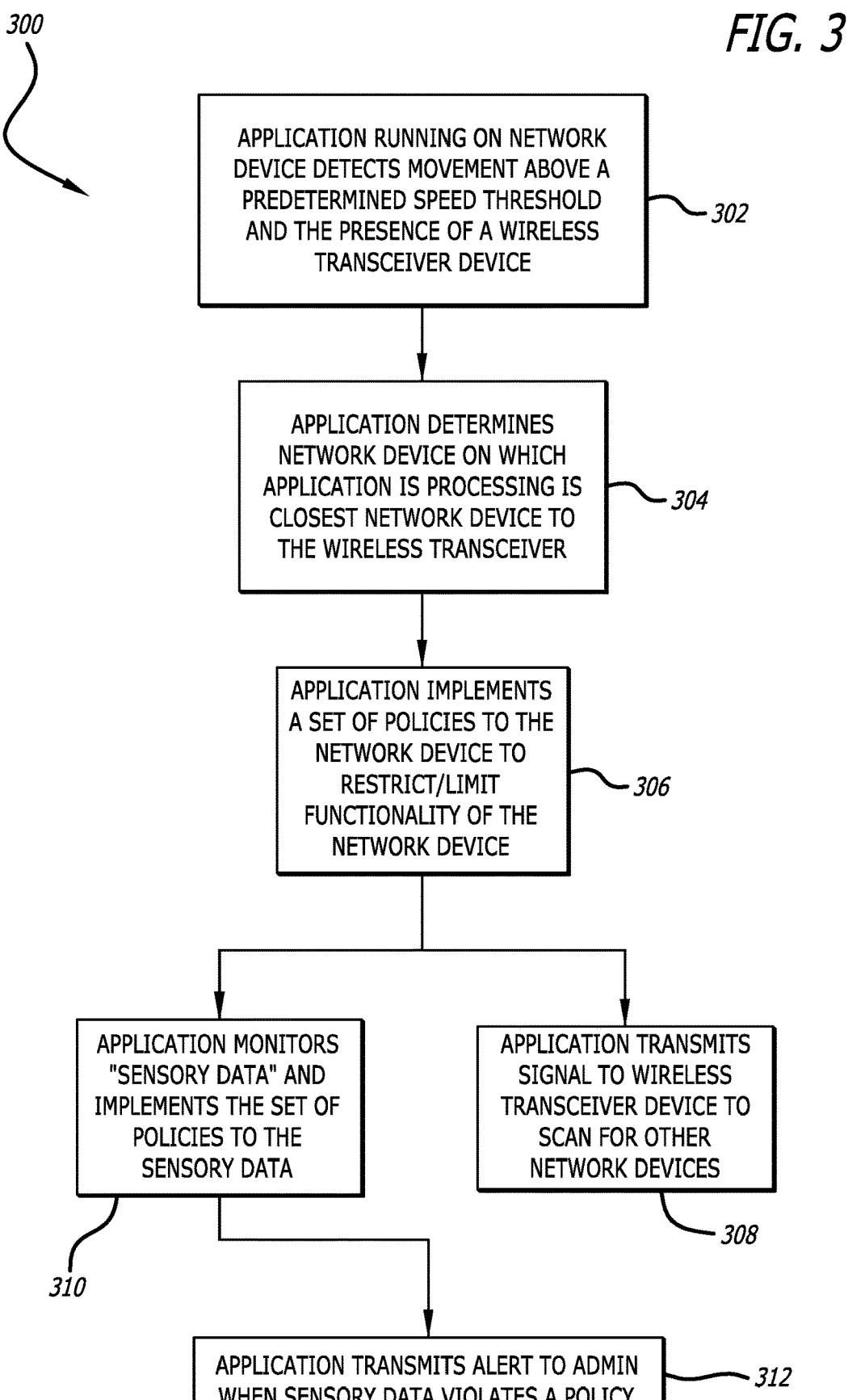

APPLICATION RUNNING ON NETWORK DEVICE DETECTS MOVEMENT ABOVE A PREDETERMINED SPEED THRESHOLD AND THE PRESENCE OF A WIRELESS TRANSCEIVER DEVICE — *302*

APPLICATION DETERMINES NETWORK DEVICE ON WHICH APPLICATION IS PROCESSING IS CLOSEST NETWORK DEVICE TO THE WIRELESS TRANSCEIVER — *304*

APPLICATION IMPLEMENTS A SET OF POLICIES TO THE NETWORK DEVICE TO RESTRICT/LIMIT FUNCTIONALITY OF THE NETWORK DEVICE — *306*

APPLICATION MONITORS "SENSORY DATA" AND IMPLEMENTS THE SET OF POLICIES TO THE SENSORY DATA
*310*

APPLICATION TRANSMITS SIGNAL TO WIRELESS TRANSCEIVER DEVICE TO SCAN FOR OTHER NETWORK DEVICES — *308*

APPLICATION TRANSMITS ALERT TO ADMIN WHEN SENSORY DATA VIOLATES A POLICY — *312*

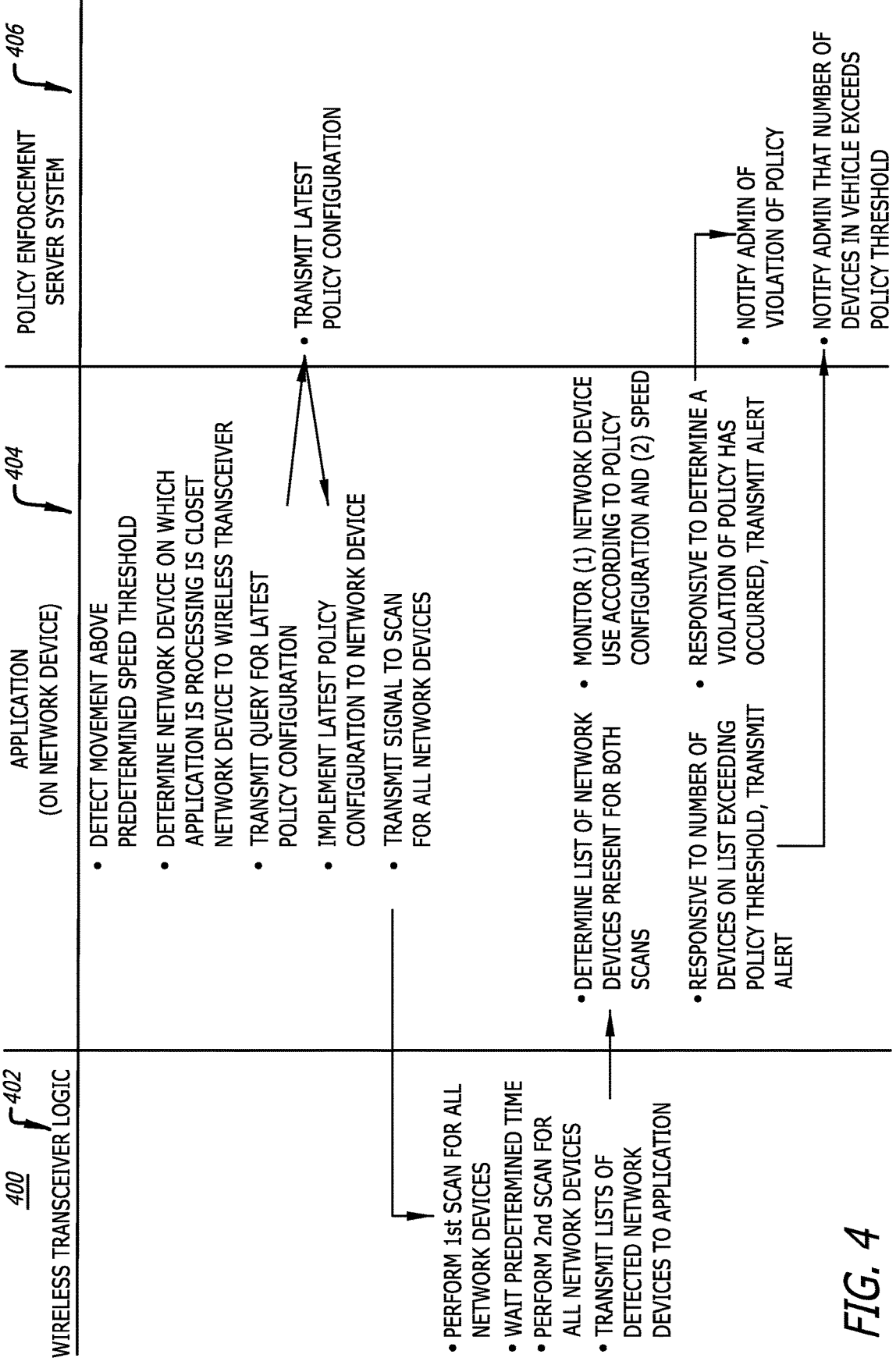

400

402
WIRELESS TRANSCEIVER LOGIC

- PERFORM 1st SCAN FOR ALL NETWORK DEVICES
- WAIT PREDETERMINED TIME
- PERFORM 2nd SCAN FOR ALL NETWORK DEVICES
- TRANSMIT LISTS OF DETECTED NETWORK DEVICES TO APPLICATION

404
APPLICATION (ON NETWORK DEVICE)

- DETECT MOVEMENT ABOVE PREDETERMINED SPEED THRESHOLD
- DETERMINE NETWORK DEVICE ON WHICH APPLICATION IS PROCESSING IS CLOSET NETWORK DEVICE TO WIRELESS TRANSCEIVER
- TRANSMIT QUERY FOR LATEST POLICY CONFIGURATION
- IMPLEMENT LATEST POLICY CONFIGURATION TO NETWORK DEVICE
- TRANSMIT SIGNAL TO SCAN FOR ALL NETWORK DEVICES
- DETERMINE LIST OF NETWORK DEVICES PRESENT FOR BOTH SCANS
- RESPONSIVE TO NUMBER OF DEVICES ON LIST EXCEEDING POLICY THRESHOLD, TRANSMIT ALERT
- MONITOR (1) NETWORK DEVICE USE ACCORDING TO POLICY CONFIGURATION AND (2) SPEED
- RESPONSIVE TO DETERMINE A VIOLATION OF POLICY HAS OCCURRED, TRANSMIT ALERT

406
POLICY ENFORCEMENT SERVER SYSTEM

- TRANSMIT LATEST POLICY CONFIGURATION
- NOTIFY ADMIN OF VIOLATION OF POLICY
- NOTIFY ADMIN THAT NUMBER OF DEVICES IN VEHICLE EXCEEDS POLICY THRESHOLD

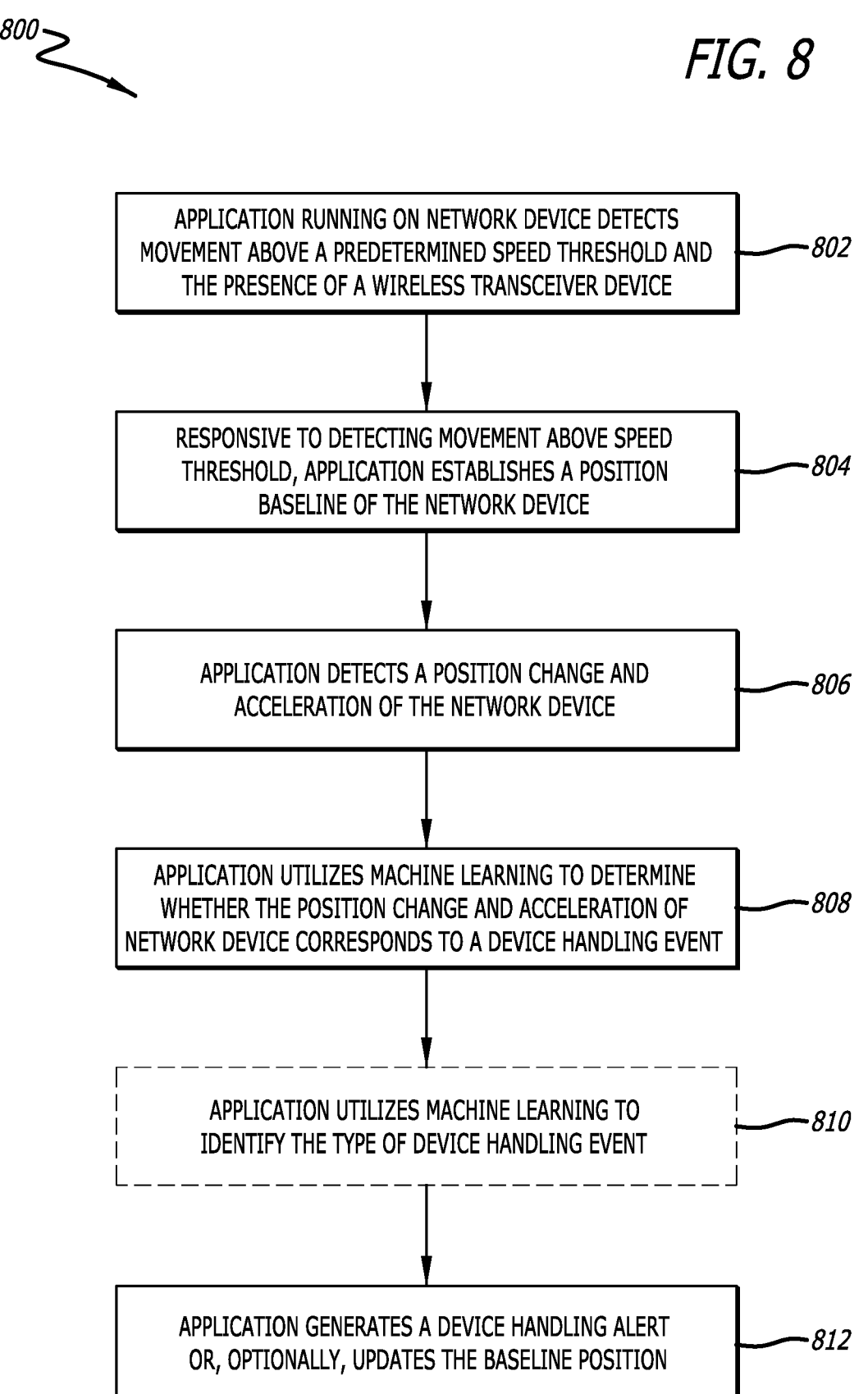

APPLICATION RUNNING ON NETWORK DEVICE DETECTS MOVEMENT ABOVE A PREDETERMINED SPEED THRESHOLD AND THE PRESENCE OF A WIRELESS TRANSCEIVER DEVICE — 802

RESPONSIVE TO DETECTING MOVEMENT ABOVE SPEED THRESHOLD, APPLICATION ESTABLISHES A POSITION BASELINE OF THE NETWORK DEVICE — 804

APPLICATION DETECTS A POSITION CHANGE AND ACCELERATION OF THE NETWORK DEVICE — 806

APPLICATION UTILIZES MACHINE LEARNING TO DETERMINE WHETHER THE POSITION CHANGE AND ACCELERATION OF NETWORK DEVICE CORRESPONDS TO A DEVICE HANDLING EVENT — 808

APPLICATION UTILIZES MACHINE LEARNING TO IDENTIFY THE TYPE OF DEVICE HANDLING EVENT — 810

APPLICATION GENERATES A DEVICE HANDLING ALERT OR, OPTIONALLY, UPDATES THE BASELINE POSITION — 812

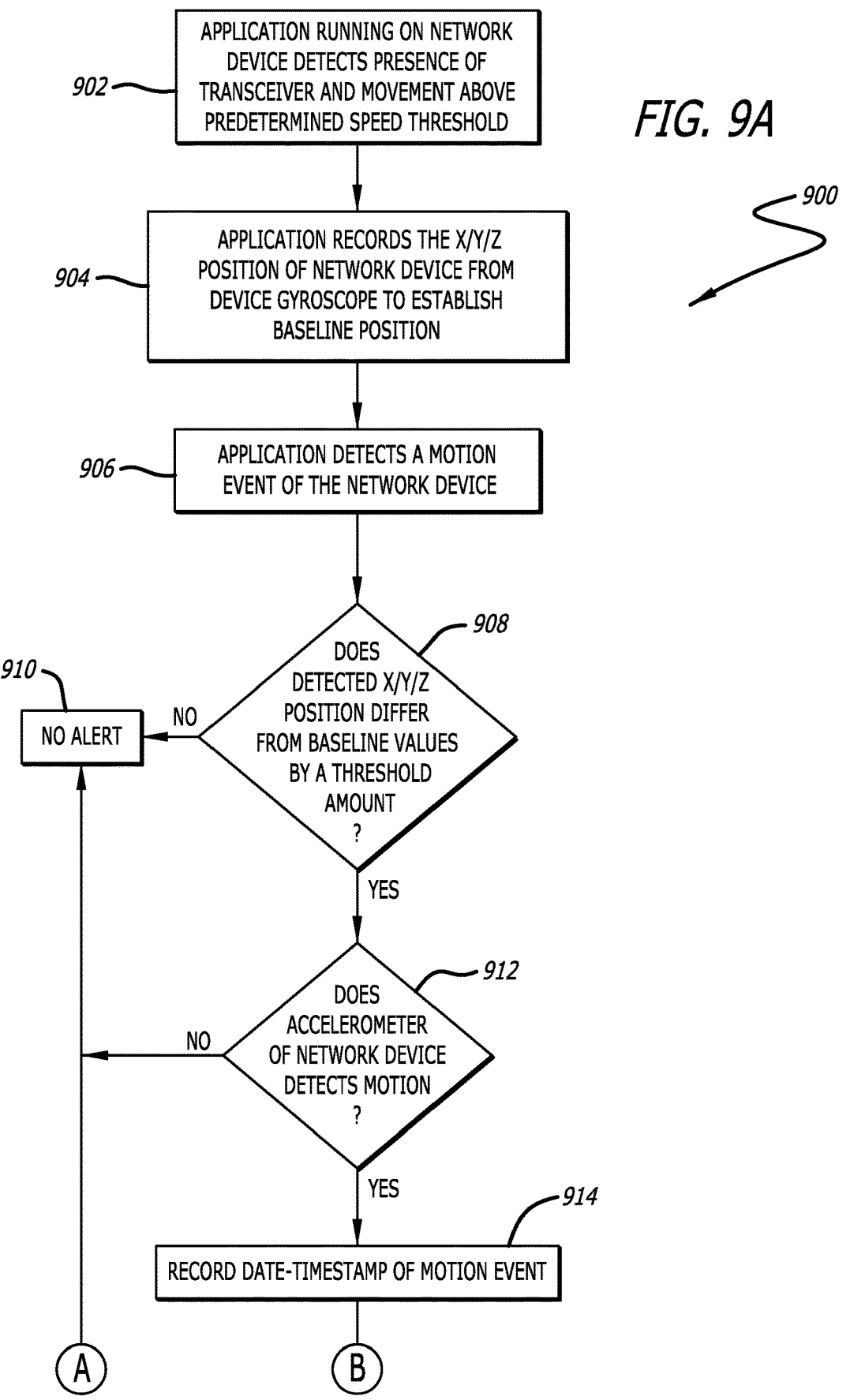

*FIG. 9A*

902 — APPLICATION RUNNING ON NETWORK DEVICE DETECTS PRESENCE OF TRANSCEIVER AND MOVEMENT ABOVE PREDETERMINED SPEED THRESHOLD

904 — APPLICATION RECORDS THE X/Y/Z POSITION OF NETWORK DEVICE FROM DEVICE GYROSCOPE TO ESTABLISH BASELINE POSITION

906 — APPLICATION DETECTS A MOTION EVENT OF THE NETWORK DEVICE

908 — DOES DETECTED X/Y/Z POSITION DIFFER FROM BASELINE VALUES BY A THRESHOLD AMOUNT ?

910 — NO ALERT          NO

900

YES

912 — DOES ACCELEROMETER OF NETWORK DEVICE DETECTS MOTION ?          NO

YES

914 — RECORD DATE-TIMESTAMP OF MOTION EVENT

Ⓐ          Ⓑ

SYSTEMS AND METHODS FOR EVALUATING MOTION EVENT TYPES USING MACHINE LEARNING

CROSS-REFERENCE TO RELATED APPLICATIONS

The present application is a continuation of U.S. patent application Ser. No. 17/345,383 filed on Jun. 11, 2021, the entire contents of which hereby incorporated by reference.

FIELD

Embodiments of the disclosure relate to the field of restricting use of network devices. More specifically, one embodiment of the disclosure relates to a system that implements a set of policies configured to restrict or limit the use of a network device. Further, some embodiments of the disclosure relate to restricting or limiting the use of a mobile device by a driver of a vehicle.

GENERAL BACKGROUND

Distractions while driving, especially those from electronic devices, are at an all-time high. As mobile devices (e.g., cell phones) have become ubiquitous, it is commonplace for a driver to get into a vehicle, start driving and become distracted with his/her cell phone. For instance, drivers often receive and respond to text messages or emails, browse the internet, or browse social media platforms while driving.

Driving while distracted as a result of the presence of electronic devices within reach is a dangerous, and at times, deadly, situation. Although some states have outlawed the act of using a cell phone while driving, not all drivers regularly adhere to these laws. Additionally, drivers may be distracted merely by notification alerts received by a cell phone. For example, a cell phone placed in a cup holder of the center console may alert the driver to a new text message or email via an audible and/or visual notification. The notification may cause the driver to take his/her eyes off of the road momentarily, which has the potential to result in an accident.

Many parents or employers wish to prevent their children/employees from being distracted by the child's or employee's cell phone while driving but also want their children or employees to have a cell phone in case of emergency. However, the use of some functionality of a cell phone may be warranted while driving. For example, a functionality of a cell phone that provides turn-by-turn directions may be used by some drivers and does not cause unnecessary distractions. Further, some drivers may be able to connect their cell phones to the vehicle's audio system and play music while driving without causing unnecessary distractions. Additionally, once a child or employee completes his/her drive, there is no need to prevent the child or employee from using his/her cell phone.

Thus, a system, method and apparatus are needed to restrict or limit the use of some or all functionality of certain network devices, such as mobile devices for example, within a predefined area of an interior cabin of a vehicle when the vehicle is in use.

BRIEF DESCRIPTION OF THE DRAWINGS

Embodiments of the invention are illustrated by way of example and not by way of limitation in the figures of the accompanying drawings, in which like references indicate similar elements and in which:

FIG. 3 is a flowchart illustrating an exemplary process of applying and monitoring a set of policies by the policy enforcement system of FIG. 1A.

FIG. 4 is an operational flow diagram illustrating operations performed in the process of FIG. 3.

FIG. 8 is a flowchart illustrating an exemplary process for configuring a software application of a network device for use with the policy enforcement system of FIG. 1A.

FIGS. 9A-9B is a flowchart illustrating an exemplary process for monitoring network device location data and acceleration data and providing notifications corresponding thereto.

DETAILED DESCRIPTION

Figure 1A:
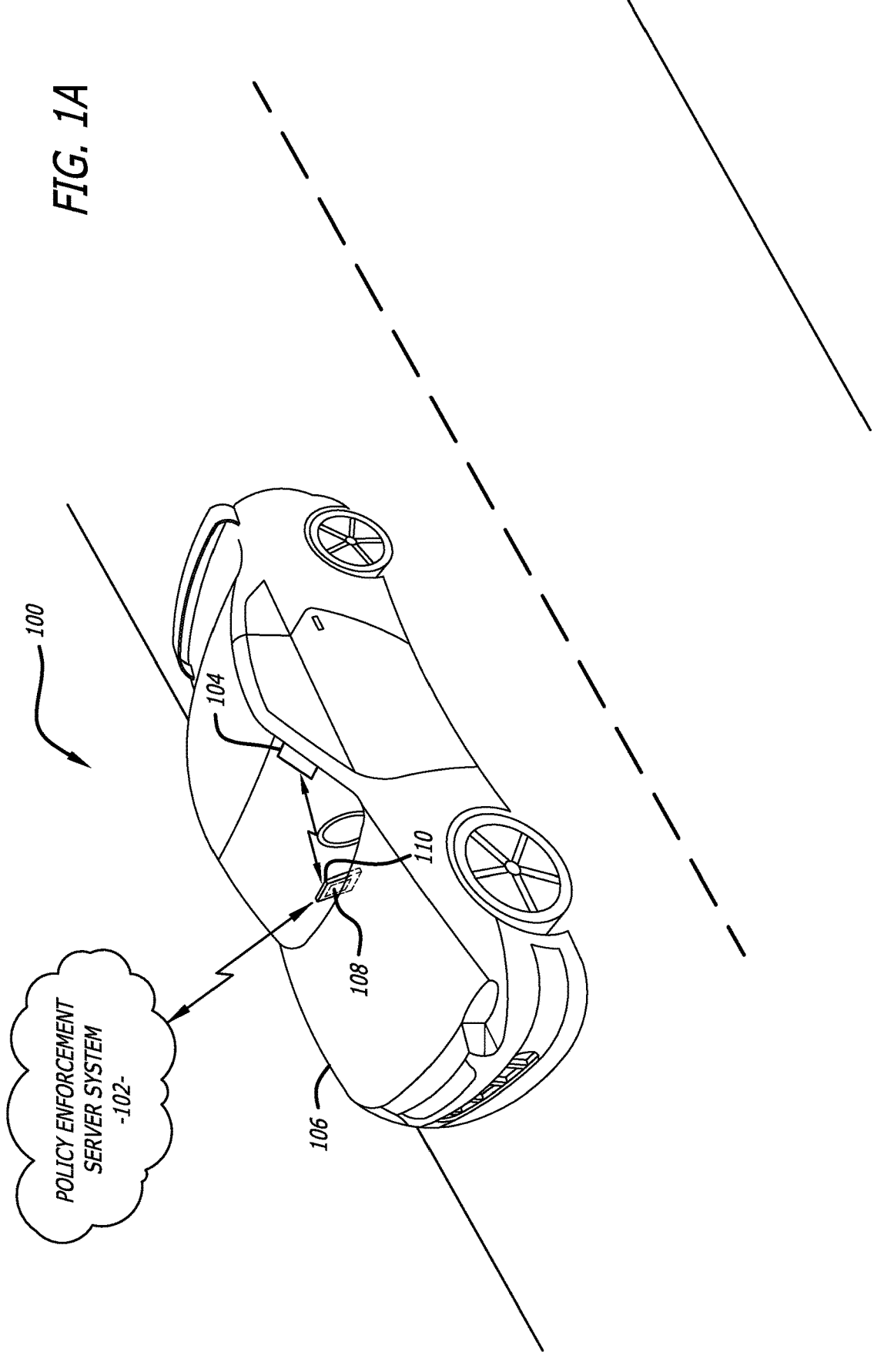
FIG. 1A is an exemplary illustration of a deployment of a policy enforcement system in connection with a first vehicle.

Embodiments of a system and methods are described for determining whether a network device is a driver device on which a set of policies are to be implemented to restrict or limit the use of the network device when operating in the vehicle. For purposes of clarity, a driver device may be considered as a network device on which a set of policies is to be implemented as compared to other network devices within the vehicle (or "passenger devices") on which a set of policies is not to be implemented. More particularly, a driver device may be assumed to be the network device that the driver of the vehicle will attempt to operate (e.g., the network device physically located closest to the driver).

Described herein is a policy enforcement system that includes a transceiver and a policy enforcement application operating on a network device. In some embodiments, the policy enforcement application may be downloaded on the network device. Generally, the policy enforcement system performs various methods to determine whether one or more network devices are located within an interior cabin space of a vehicle and whether the vehicle, along with each the network device, is moving at a speed above a predetermined threshold. When the policy enforcement system determines that the vehicle and a network device are traveling at a speed above the predetermined threshold, the policy enforcement application operating on the network device implements a set of policies that restrict or limit the use of the network device when operating in the vehicle. For example, the policy enforcement application may restrict or disable one or more predetermined functionalities of the network device. For instance, the functionality to make phone calls or receive emails or other messages may be prevented while the set of policies are implemented. Additional examples of restricting functionality may include, but are not limited or restricted to, prevention of the use of social media applications, prevention of the use of a camera, preventing of the use of internet browser applications, etc.

The transceiver may be an electronic device capable of transmitting wireless signals, such as BLUETOOTH® beacons (e.g., BLUETOOTH® Low Energy (BLE)). Herein, the terms "transceiver" and "wireless transceiver" are used interchangeably, where wireless may refer to the transmission or receipt of data to or from a network device located within a proximity of the transceiver, where the proximity may include the interior cabin of the vehicle in which the transceiver is located as well as a surrounding area. For instance, the proximity of the transceiver may be an area defined by a radius of a circumference where the radius extends from the transceiver. As described below, the transceiver and a network device within proximity to the transceiver may communicate via an exchange of data, such as in the form of a wireless message. Based on the exchanged data, the policy enforcement application operating on the network device may implement a set of policies to restrict or limit the use of the network device when operating in the vehicle. In some embodiments, the transceiver may be located at a position within an interior cabin of a vehicle that is in close proximity to a driver's seat or to the steering wheel relative to other seats within the vehicle. For example, the transceiver may be affixed to the dashboard behind the steering wheel or in line with a driver's seat. In other examples, the transceiver may be affixed to the ceiling of the vehicle above the steering wheel or the driver's seat. In yet other embodiments the transceiver may be affixed to an upper left corner, a lower left corner or generally the left side of the vehicle's windshield relative to the driver's perspective.

The policy enforcement system may also monitor use, or attempted use, of a network device. For example, the policy enforcement application may monitor motion of the network device and determine whether such motion corresponds to a phone handling event, i.e., where the network device is being handled by a person. The policy enforcement application may also monitor the speed at which the network device is traveling to determine whether the set of policies should remain implemented or be released (e.g., no longer implemented). In some embodiments, the policy enforcement application may obtain data from the transceiver, where such data may be utilized by the policy enforcement application, in addition to the speed at which the network device is traveling, to determine whether the set of policies should remain implemented or be released.

Additionally, as will be discussed in further detail below, the policy enforcement system may perform operations that analyze data obtained by sensors of the network device such as data obtained from a gyroscope (X/Y/Z position data) and data obtained from an accelerometer (acceleration data). As is understood by those skilled in the art, a gyroscope measures the rate at which a device rotates around one or more spatial axes, such as a three-axis gyroscope, which detects rotation values for each of an X-, Y- and Z-axis (referred to as X/Y/Z position data). In some embodiments, the X/Y/Z position data may be represented as values measured in radians per second around the given axis, which may be positive or negative depending on the direction of rotation.

The policy enforcement system may perform additional operations and/or functionalities not explicitly described above that will become apparent throughout the description below and in view of the corresponding figures.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

As mentioned above, the terms "transceiver" and "wireless transceiver" may be used interchangeably. Additionally, the term wireless transceiver refers to an electronic device configured to transmit and/or receive a wireless signal. The wireless transceiver may transmit data using any wireless technology, examples of which may include, but are not limited or restricted to, Wi-Fi, Bluetooth®, Bluetooth® Low Energy (BLE), radio waves (e.g., radio-frequency identification), one or more beacons, etc. In one embodiment, a wireless transceiver may refer to a communication interface of the center console of a vehicle. In a second embodiment, a wireless transceiver may refer to a standalone electronic device that provides a wireless communication interface.

The term "computerized" generally represents that any corresponding operations are conducted by hardware in combination with software and/or firmware.

The term "network device" may be construed as a physical, electronic device or a virtual electronic device that is based on the execution of one or more software modules. The network device may be communicatively coupled to a public network such as the Internet or a private network such as a wireless data telecommunication network, wide area network, a type of local area network (LAN), or a combination of networks. Examples of the network device may include, but are not limited or restricted to, a physical electronic device (e.g., a personal computer such as a desktop, laptop, tablet or netbook; a mobile phone; a standalone appliance; a sensor; etc.). A network device may feature a plurality of electronic components, including one or more hardware processors (generally referred to as "processor"), at least one non-transitory storage medium, and an (network and/or I/O) interface. These components may be encased in a housing, which may be made entirely or partially of a rigid material (e.g., hard plastic, metal, glass, composites, or any combination thereof) that protects these components from certain environmental conditions.

The term "message" generally refers to any type of signaling such as wireless signaling including a beacon signal. Alternatively, the message may be information in a prescribed format and transmitted in accordance with a suitable delivery protocol. Hence, each message may be in the form of one or more packets, frames, or any other wireless signaling having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture—Policy Enforcement System

Referring to FIG. 1A, an exemplary illustration of a deployment of a policy enforcement system in connection with a first vehicle is shown. The policy enforcement system 100 includes a policy enforcement server system 102, a network device sensor 104 (also referred to herein as a "wireless transceiver") and an application 108. As illustrated, the policy enforcement system 100 is deployed in connection with the vehicle 106 wherein the wireless transceiver 104 and a network device 110 having the application 108 installed thereon are located within the vehicle 106. In one embodiment as illustrated, the policy enforcement server system 102 is in communication with the application 108 through the network device 110. However, in other embodiments, each of the components of the policy enforcement system 100 are in communication and operate collectively to enforce one or more sets of policies.

In particular, at a high-level, the wireless transceiver 104, the application 108 and the network device 110 perform operations to determine whether the vehicle 106 is moving and whether a set of policies is to be implemented with respect to the network device 110 based on any detected movement of the vehicle 106. In various embodiments, the application 108 may obtain sensory data from components of the network device 110 in order to determine movement (e.g., from an accelerometer and/or from a GPS unit). Alternatively, or in addition to, the wireless transceiver 104 may capture movement data via an accelerometer and/or vibration data via a vibration sensor. As will be discussed below, the movement/vibration data may be provided to the application 108 and be utilized by the application 108 in determining whether implementation of the set of policies is to be continued. As used herein, sensory data refers to any data associated with data obtained through one or more sensors (e.g., accelerometer, GPS unit, gyroscope, vibration sensor, etc.).

Figure 1B:
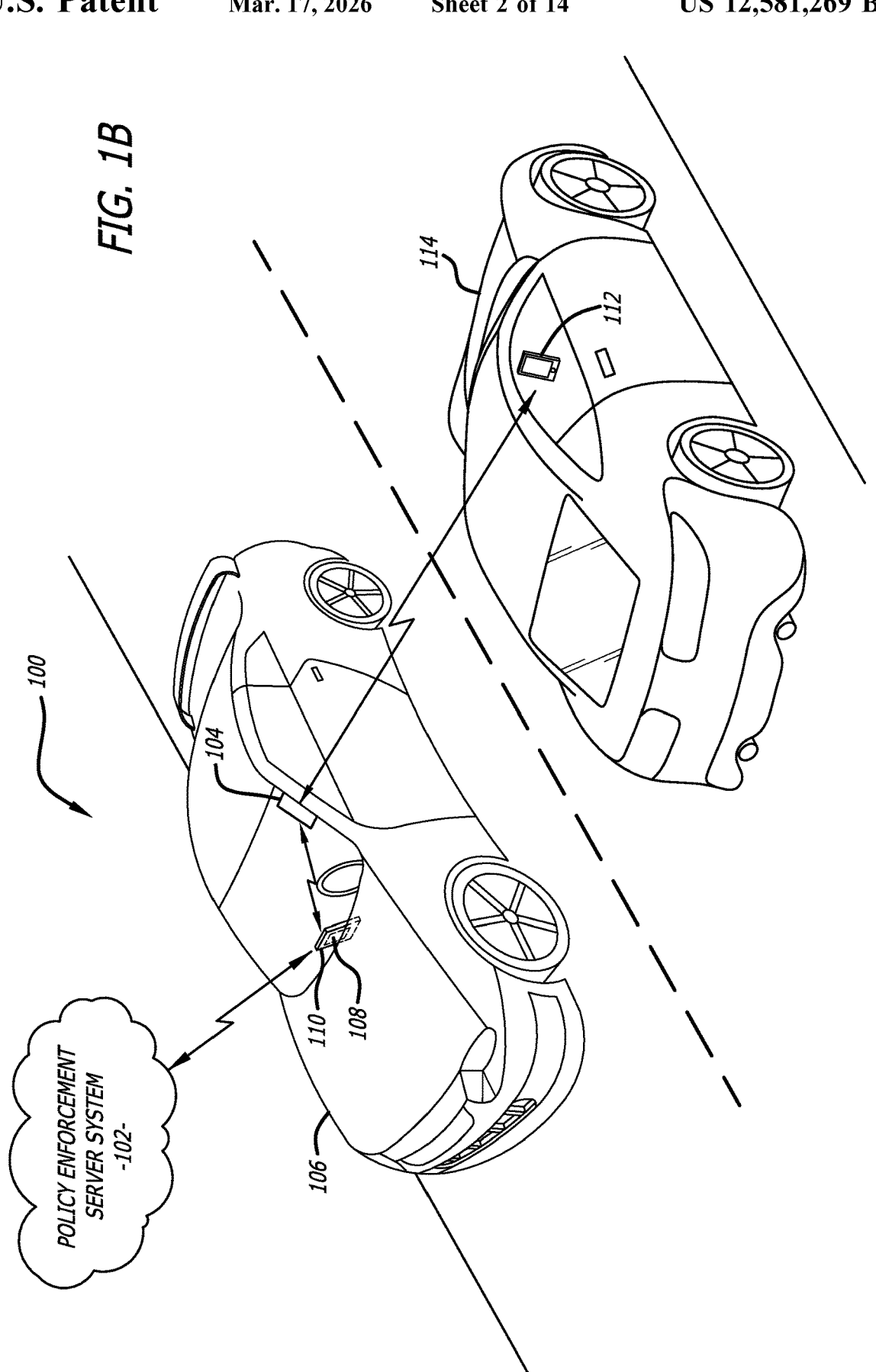
FIG. 1B is a second exemplary illustration of the policy enforcement system of FIG. 1A interacting with a network device of a second vehicle.
Figure 2:
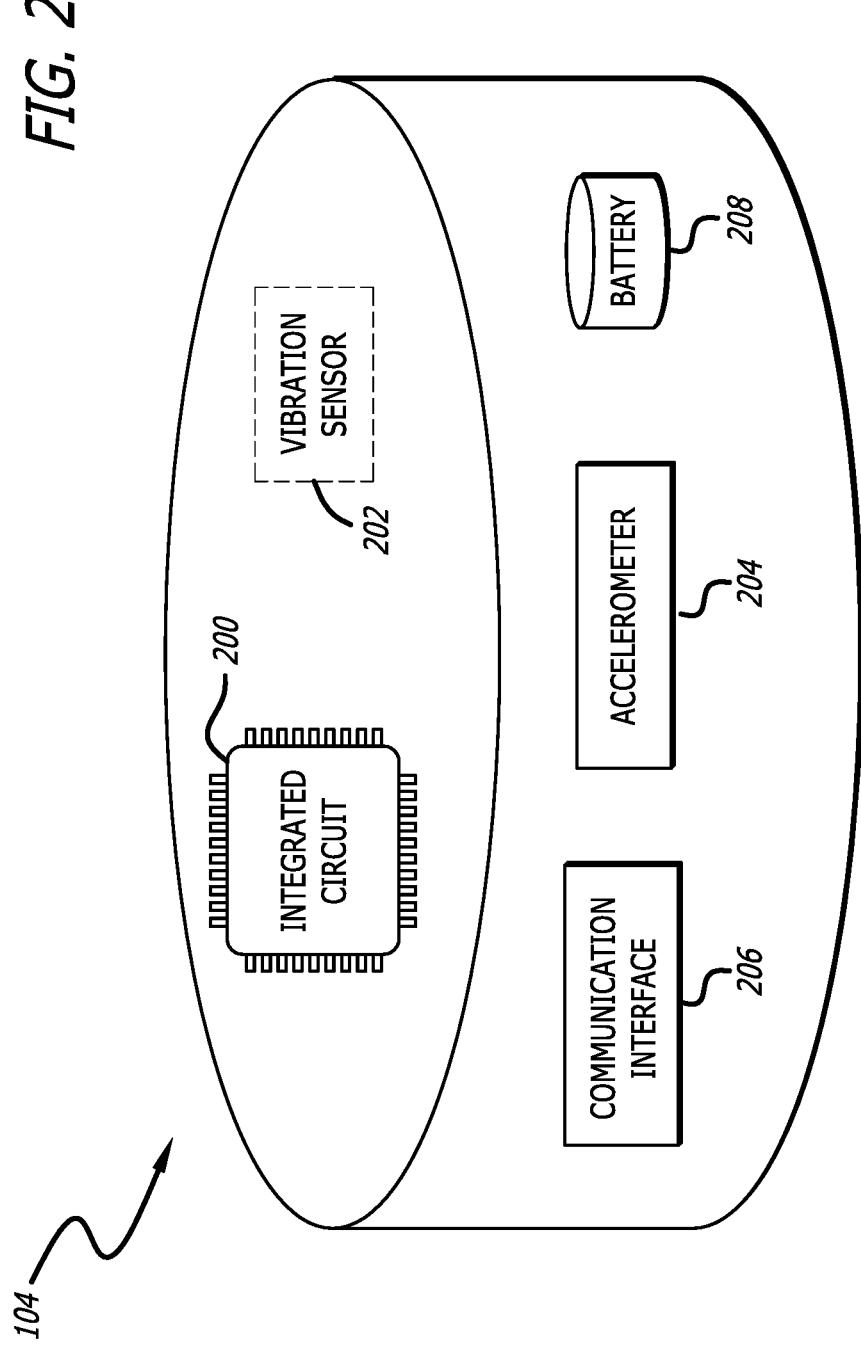
FIG. 2 is an exemplary block diagram of a wireless transceiver of the policy enforcement system of FIG. 1A.

Referring now to FIG. 1B, a second exemplary illustration of the policy enforcement system of FIG. 1A interacting with a network device of a second vehicle is shown. FIG. 1B provides a similar illustration as FIG. 1A in which the policy enforcement system 100 is deployed in connection with the vehicle 106. However, FIG. 1B further illustrates that the policy enforcement system 100 may interact with network devices located in other vehicles (e.g., the network device 112 located within the vehicle 114). As discussed above, each network device may transmit a signal at regular time intervals including certain information, such as a Universally Unique Identifier (UUID), that enables logic included within the wireless transceiver ("wireless transceiver logic") to identify each network device. In some embodiments, the wireless transceiver logic may be programmed into an integrated circuit, as seen in FIG. 2. As will be discussed below with respect to FIGS. 4-5B, the wireless transceiver may form one or more lists identifying detected network devices in order to assess the content of the list(s) against a set of policies and/or driver/vehicle guidelines (discussed below), and, when applicable, transmit an alert to an administrator. Although not illustrated, an instance of the application 108 may be installed on the network device 112.

Figure 1C:
FIG. 1C is a third exemplary illustration of the policy enforcement system of FIG. 1A wherein two network devices are located within the first vehicle.

Referring to FIG. 1C, a third exemplary illustration of the policy enforcement system of FIG. 1A wherein two network devices are located within the first vehicle is shown. FIG. 1C provides a similar illustration as FIG. 1A in which the policy enforcement system 100 is deployed in connection with the vehicle 106. However, FIG. 1C further illustrates that the policy enforcement system 100 may interact with multiple network devices located in a single vehicle (e.g., the network devices 110, 118 located within the vehicle 106). In various embodiments, a first set of policies may be applied by each application to their corresponding network devices, different sets of policies may be applied to each network device, or a first set of policies may be applied to only one of the multiple devices. As will be discussed in detail below, each instance of the policy enforcement application (e.g., application 108 and 116) will attempt to connect to and communicate with wireless transceiver 104. Based on information received from the wireless transceiver 104, each instance of the policy enforcement application will determine whether its corresponding network device is closest to the wireless transceiver 104, and when its corresponding network device is closest to the wireless transceiver 104, the application will apply a set of policies to restrict and/or limit the functionality of its network device. In other embodiments, each instance of the policy enforcement application will determine whether its corresponding network device is within a predetermined distance to the wireless transceiver 104 (e.g., based on the corresponding RSSI value), and when its corresponding network device is within the predetermined distance to the wireless transceiver 104, the application will apply a set of policies to restrict and/or limit the functionality of its network device.

In some embodiments, a set of policies may only be applied to the network device determined to be closest in proximity to the wireless transceiver 104, i.e., with the expectation that such network device is being handled by the driver (i.e., as is seen in FIGS. 1A-1C, the wireless transceiver 104 is coupled to the interior of the vehicle on the side of the windshield opposite a front passenger seat). In alternative embodiments, a first set of policies may be applied to all network devices determined with be located within the vehicle 106 in order to remove all distractions. Predetermined rules or configuration settings may be used to determine which of the above applies. For example, a first rule set (e.g., driver/vehicle guidelines) may be used by the policy enforcement system 100 when deployed in connection with a truck or van within a commercial fleet (e.g., apply a set of policies to all network devices having an instance of the policy enforcement application installed thereon). As an additional example, a second rule set may be used by the policy enforcement system 100 when deployed in connection with an individual's personal vehicle (e.g., apply a set of policies only to the network device determined to be located closest to the wireless transceiver, i.e., the network device of the driver).

Referring to FIG. 2, an exemplary block diagram of a wireless transceiver of the policy enforcement system of FIG. 1A is shown. The wireless transceiver 104 (as referenced above, also referred to as a "network device sensor") is shown as having the shape of an ellipse. The wireless transceiver 104 may have a height (e.g., constant in some embodiments but may vary in others), in order to accommodate components housed within. It should be understood that the wireless transceiver 104 may take many different shapes and the disclosure is not intended to be limited to the wireless transceiver 104 having the shape of an ellipse. Examples of other shapes include, but are not limited or restricted to, a triangle, a rectangle, a rhombus or a trapezoid. Further, the wireless transceiver 104 may be, for example, predominantly spherical and include a flat edge configured for attachment to a surface, such as an interior panel of a vehicle. In some embodiments, the wireless transceiver 104 may include a housing, which is made entirely or partially of a hardened material (e.g., hardened plastic, metal, glass, composite or any combination thereof) that protects circuitry and other components within the housing, namely an integrated circuit 200, an optional vibration sensor 202, an accelerometer 204, a communications interface 206 and a battery 208. The communication interface 206, under control by a communication interface logic (not shown), enables communications with external network devices, such as network devices and/or a cloud server.

According to one embodiment of the disclosure, the communication interface 206 may be implemented with one or more radio units for supporting wireless communications with other electronic devices. Additionally, or in the alternative, the communication interface 206 may be implemented as a physical interface including one or more ports for wired connectors. The communication interface logic may perform operations to cause the receipt and transmission of electronic data via the communication interface 206.

The integrated circuit 200 may be configured to perform operations including receiving and parsing signals from network devices (e.g., to identify each network device and determine the RSSI of each signal) and performing scans for network devices to determine network devices detected during multiple scans. In one embodiment, a scan may refer to the transceiver 104 initiating a time period ("scan time period") during which it receives and records transmissions from network devices for further analysis, where a transmission may be referred to as a beacon that are automatically transmitted by a network device at regular intervals. A transmission may include certain information such as a device address (such as a UUID or other identifier), an RSSI value, and data (which, in some embodiments, may be an advertisement packet). The scan may conclude when the transceiver 104 no longer records transmissions that were received (or otherwise detected) for the further analysis.

In one embodiment, the further analysis may include "detecting" network devices that are within a predetermined proximity to the transceiver 104 based on the RSSI value of the received and recorded transmission during the scan. For example, the integrated circuit 200 of the transceiver 104 may perform operations including comparing the RSSI of a transmission from each network device against a guideline threshold (where satisfying the comparison indicates detection of a network device within the predetermined proximity) and transmitting an alert to the policy enforcement server system 102 of FIGS. 1A-1C when a plurality of network devices are detected (or when the number of network devices is above a threshold number, which may be based on the number of network devices expected in the vehicle at a given time based on known expected routes, expected drivers and expected passengers). The integrated circuit may also perform operations that cause the communication interface 206 to transmit sensory data to the application 108 and/or the policy enforcement server system 102 (in embodiments in which the policy enforcement server system 102 is in communication with wireless transceiver 104). Additional operations performed by the integrated circuit 200 included in the further analysis are discussed throughout, wherein the integrated circuit 200 may be referred to as "wireless transceiver logic" in some embodiments.

In embodiments in which the wireless transceiver 104 includes the vibration sensor 202, the vibration sensor 202 is configured to perform operations including detecting and recording vibration. As will be discussed below, the vibration sensor 202 may detect vibration of a vehicle and the wireless transceiver 104 may transmit a signal to a network device (e.g., the network device 110), to be parsed and analyzed by the application 108. The application 108 may then utilize the vibration data in determining whether to implement, or withdraw implementation of, a set of policies with respect to the network device. The accelerometer 204 performs operations including detecting and recording acceleration (e.g., movement). As will be discussed below, the accelerometer 204 may detect acceleration of a vehicle and the wireless transceiver 104 may transmit a signal to a network device (e.g., the network device 110), to be parsed and analyzed by the application 108. The application 108 may then utilize the acceleration data ("movement data") in determining whether to implement, or withdraw implementation of, a set of policies with respect to the network device.

In embodiments in which the vibration sensor 202 is not included in the wireless transceiver 104, the wireless transceiver 104 may obtain sensory data from the accelerometer 204 and perform operations, via logic, that simulate the functionality of a vibration sensor. This functionality is simulated via one of several available operating modes of the accelerometer 204 by utilizing a method that recognizes both positive and negative acceleration, and generates an interrupt when the value is greater than a predetermined threshold. The value of acceleration represents movement in any of the X, Y, or Z directions, and/or any combination thereof. Each interrupt lasts for a calculated length of time using the formula: 1/ODR, with Output Data Rate (ODR) representing a predetermined frequency, the value of which is configured and stored in control registers.

In some embodiments, the movement/vibration data may be a byte within a signal transmitted from the wireless transceiver to the network device at specified time intervals (e.g., every 10, 15 or 30 seconds). In some embodiments, the byte comprises a series of bits, with each bit indicating a movement/vibration status for each time interval. As one illustrative example, the signal may include the following series of bits as shown and described in the following Table 1.

TABLE 1

| Interval | Bit series | Status of last interval |
|---|---|---|
| $time_0$ | 0000 0001 | movement/ vibration detected |
| $time_1$ | 0000 0011 | movement/ vibration detected |
| $time_2$ | 0000 0111 | movement/ vibration detected |
| $time_3$ | 0000 1110 | no detection |
| $time_4$ | 0001 1101 | movement/ vibration detected |
| $time_5$ | 0011 1011 | movement/ vibration detected |
| $time_6$ | 0111 0111 | movement/ vibration detected |
| $time_7$ | 1110 1111 | movement/ vibration detected |

Each interval may comprise 10 seconds and the delay time for withdrawing implementation of the set of policies may be 80 seconds. Therefore, once the application detects movement and implements the set of policies, the application will monitor the bit series received in the signal from the wireless transceiver and continue implementation of the policy until either (1) the bit series reads "0000 0000" (i.e., no movement for 80 seconds), or (2) the application no longer detects the presence of the wireless transceiver. In one embodiment, the status of "no detection" at $time_3$ may be a result of the vehicle stopping at a traffic sign.

As discussed herein, withdrawal of the implementation of the set of policies refers to the application of the policy enforcement system returning the network device to its unrestricted or unlimited operating state (e.g., full access to all applications is provided, or at least the same access is provided that was available prior to implementation of the set of policies).

In some embodiments, the battery 208 may be a single use battery such that upon depletion of its energy store, the wireless transceiver 104 may be disposed of. In alternative embodiments, the battery 208 may be one of the following rechargeable battery types, nickel cadmium (NiCd), Nickel-Metal Hydride (NiMH), Lithium Ion (Li-ion), Lithium Ion Polymer (Li-ion polymer), etc.

III. General Methodologies—Policy Enforcement System

Referring to FIG. 3, a flowchart illustrating an exemplary process of applying and monitoring a set of policies by the policy enforcement system of FIG. 1A is shown. Each block illustrated in FIG. 3 represents an operation performed in the method 300 of applying a set of policies to a network device and monitoring the network device according to at least a subset of the set of policies. In some embodiments, a set of policies may include multiple subsets (i.e., less than the whole). In some such embodiments, the multiple subsets may include a first subset that is directed to restricting the functionality of the network device and a second subset that is directed to monitoring instructions and applicable thresholds. For example, implementation of the first subset of policies may result in removal of icons from the display screen of a mobile device (see FIGS. 5A-5B) in order to restrict functionality of the mobile device. Additionally, implementation of the second subset of policies may cause logic associated with the policy enforcement system (i.e., an application installed on a network device) to monitor certain aspects (e.g., motion via a gyroscope and/or accelerometer).

Referring to the diagram of FIG. 3, in one embodiment, it is assumed that prior to the beginning of the method 300, the application of the policy enforcement system has been installed on a network device (e.g., a mobile device) and a network device sensor (e.g., a wireless transceiver) has been installed or placed within a vehicle. Thus, the method 300 commences when the application processing on the network device detects (i) movement above a predetermined speed threshold (e.g., 5, 10, 15 mph), and (ii) the presence of the wireless transceiver (block 302). In some embodiments, the application obtains sensory data from an accelerometer of the network device in order to determine movement (i.e., acceleration) or from a vibration sensor. Alternatively, or in addition to, the application may obtain sensory data from a GPS unit of the network device in order to determine movement. The presence of the wireless transceiver may be detected based on a signal transmitted from the wireless transceiver in response to a beacon signal transmitted by the network device. The application and wireless transceiver logic then engage in communication in order to determine communication methods and protocol (e.g., a frequency on which to communicate as discussed below). In some embodiments the sensory data obtained from the network device sensor is coupled with the sensory data obtained from the network device to perform a "handshake" that confirms the presence of a wireless transceiver, which prompts the application to implement a set of policies to the network device to restrict and/or limit functionality of the network device. As used herein, the term "handshake" refers to the exchange of information between two devices in order to authenticate one or both of the devices.

In response to detecting (i) movement above a predetermined speed threshold, and (ii) the presence of the wireless transceiver, the application determines whether the network device on which the application is processing is the closest network device to the wireless transceiver (304). FIG. 3 illustrates the flow of method 300 when the application determines the network device on which the application is processing is the closest network device to the wireless transceiver.

Responsive to determining the network device on which the application is processing is the closest network device to the wireless transceiver, the application implements a set of policies, wherein at least a first subset of the policies may restrict or limit functionality of the network device (block 306). As referenced above, the application may perform operations that result in limiting or restricting the functionality of the network device, which may include removing icons from a display screen of the network device as indicated by the first subset of policies. For example, as seen below in FIGS. 5A-5B, icons associated with certain applications running on the network device may be removed to prevent use of the application (e.g., mail, messaging, camera, etc.). Other methods of restricting use of the network device have also been contemplated with examples including, but not limited or restricted to, shading out the icons, shrinking the icons (e.g., altering icons appearance and preventing the opening of the application), disabling and/or delaying notifications, disabling and/or delaying receipt or transmission of data, etc. Other examples of restricting or limiting use of the network device are discussed above and equally applicable in this embodiment.

The method 300 then continues with additional operations that may be performed in parallel or in a concurrent manner (i.e., at least partially overlapping in time); however, there is no such requirement. In further response to detecting (i) movement above a predetermined speed threshold, and (ii) the presence of the wireless transceiver, the application causes the transmission of a signal to the wireless transceiver instructing the wireless transceiver to scan for other network devices (block 308). The scan for other network devices by the wireless transceiver may be done to determine the number of network devices within the vehicle (or within a particular physical region surrounding the wireless transceiver in other non-vehicle deployments). For instance, certain vehicle/driver guidelines may set forth an allowed number of network devices within a vehicle, potentially at certain times of the day, wherein an alert may be transmitted when the vehicle/driver guideline is violated. In other instances, one or more of the components of the policy enforcement system may trigger certain policies or alerts based on what network devices are detected, optionally depending on the time. For example, when the policy enforcement system is deployed within a set of corporate vehicles, as each network device's Universally Unique Identifier (UUID) is received by the wireless transceiver, wireless transceiver logic may determine whether any network devices detected are associated with employees, and whether the presence of multiple employees (or otherwise other network devices) is permitted under the applicable vehicle/driver guidelines and/or set of policies to be implemented.

Additionally, in further response to detecting (i) movement above a predetermined speed threshold, and (ii) the presence of the wireless transceiver, the application implements a first subset of policies to the network device thereby restricting or limiting functionality of the network device, as discussed above (block 310). Additionally, the application may monitor sensory data and apply a second subset of policies to the sensory data.

Following the implementation of the second subset of policies and responsive to determining that monitored sensory data violates one or more policies of the second subset of policies, the application causes performance of operations resulting in the transmission of an alert or signal to administrator (block 312). For instance, the application may cause transmission of the alert or signal to the policy enforcement server system 102 of FIG. 1A, which may in turn transmit an alert or signal to an administrator. Additionally, the alert or signal may be reviewed as part of a dashboard display (not shown).

Referring now to FIG. 4, an operational flow diagram illustrating operations performed in the process of FIG. 3 is shown. Specifically, the operational flow diagram includes three columns, one representing each main component of the policy enforcement system: the wireless transceiver logic (column 402); the application (column 404); and the policy enforcement server system (column 406). Each bullet point within a column represents an operation (or operations) performed by the component corresponding to the column. Further, each arrow indicates the transmission of data from a first component to a second component. In some embodiments, the assumptions discussed above with respect to FIG. 3 are equally applicable with respect to FIG. 4.

The operational flow diagram illustrates one embodiment of a process of applying and monitoring a set of policies by the policy enforcement system of FIG. 1A may begin when the application 108 detects movement above a predetermined threshold. Responsive to the detection of movement above the predetermined threshold, the application 108 determines whether the network device on which it is processing is the closest network device to the wireless transceiver 104.

When the application 108 determines whether the network device on which it is processing is the closest network device to the wireless transceiver 104, the application 108 may then transmit a query to the policy enforcement server system 102 for the latest policy configuration (i.e., set of policies to implement). As an alternative, the application 108 may retrieve and utilize the latest received policy configuration from a policy configuration data store, not shown, that is either stored locally on a network device on which the application 108 is operating, i.e., the network device 110, or is otherwise accessible to the application 108.

Following receipt of the request from the application 108, the policy enforcement server system 102 transmits the latest policy configuration to the application 108. In some embodiments, the policy enforcement server system 102 parses the request to identify the network device 110 (and optionally the corresponding user and vehicle, if such data is included in a data store accessible by the policy enforcement server system 102. The policy enforcement server system 102 may then generate a message including the latest policy configuration for transmission.

Following receipt of the message from the policy enforcement server system 102, the application 108, performs several operations which may be in any order. The following operations may also be performed in parallel and include (i) implementing the latest policy configurations with respect to the network device, and (ii) transmitting a signal to the wireless transceiver 104 to be parsed by wireless transceiver logic operating thereon instructing the wireless transceiver logic to perform a scan for additional network devices. Additionally, following the implementation of the latest policy configuration, the application 108 monitors use of the network device according to the latest policy configuration and monitors speed (e.g., of the vehicle 106). Responsive to determining that a violation of the latest policy configuration has occurred, the application 108 may transmit an alert to the policy enforcement server system 102.

Referring to the wireless transceiver 104's receipt of the instructions to scan for additional network devices, the wireless transceiver logic performs a first scan for all network devices (e.g., receives transmission (beacons) as discussed below) and records identifiers of all detected network devices (and optionally RSSI values of the beacons). The wireless transceiver logic then waits a predetermined time before performing a second scan and recording identifiers of all detected network devices. Following completion of the first and second scans, the records of detected network devices (i.e., a first list and a second list), are transmitted to the application 108, which compares the first list and the second list to determine network devices detected during each scan (i.e., present on both lists). Responsive to the number of network devices detected during both scans exceeding a policy threshold, the application 108 causes transmission of an alert to the policy enforcement server system 102. It should be noted that the determination as to whether a detected number of network devices by the wireless transceiver logic may be based on driver/vehicle guidelines. It should be noted that in some embodiments, the comparison of the lists may be performed by the wireless transceiver logic. Additionally, the first list may be transmitted to the application 108 following the completion of the first scan, there is no requirement that transmission of the first list be performed after completion of the second scan. Additionally, the disclosure is not limited to only two scans. Instead, a plurality of scans may be performed, where additional scans may improve reporting accuracy of detected network devices.

Referring again to column 406 and operations of the policy enforcement server system 102, upon receiving either an alert indicating a policy violation from the application 108 and/or an alert indicating the number of detected network devices during both scans of the wireless transceiver logic, the policy enforcement server system 102 may notify an administrator. Notice to the administrator may be through a message such as a short message service (SMS) message, a multimedia message service (MMS), email, etc. Alternatively, or in addition, notice to the administrator may be provided via (i) a dashboard and/or (ii) a software application operation on a network device (e.g., an "app" operating on a mobile phone or a tablet).

Figures 5A, 5B:
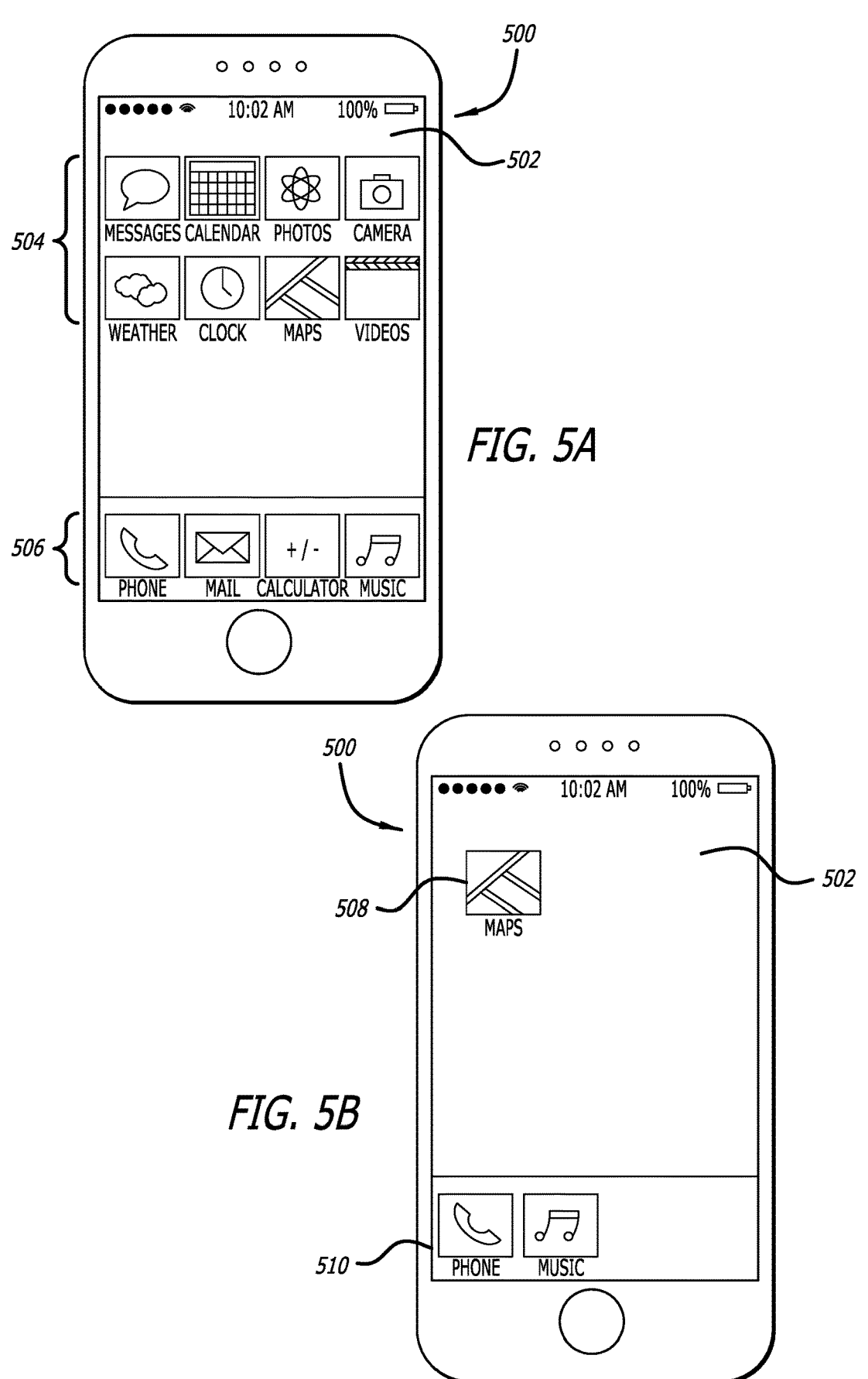
FIG. 5A is an illustration of a network device prior to the application of a set of policies by the policy enforcement system of FIG. 1A.
FIG. 5B is an illustration of the network device of FIG. 5A following the application of a set of policies by the policy enforcement system of FIG. 1A.

Referring to FIG. 5A, an illustration of a network device prior to the application of a set of policies by the policy enforcement system of FIG. 1A is shown. FIG. 5A illustrates a network device 500 (e.g., a mobile device), in a first state wherein a display screen 502 has rendered thereon a set of home screen icons 504 and a set of toolbar icons 506. The first state is one in which a set of policies directed at restricting or limiting functionality of the mobile device 500 has not been implemented. For instance, the mobile device 500 may be in the first state when not within a vehicle.

Referring to FIG. 5B, an illustration of the network device of FIG. 5A following the application of a set of policies by the policy enforcement system of FIG. 1A is shown. FIG. 5B illustrates the mobile device 500 in a second state wherein the display screen 502 has rendered thereon a modified set of home screen icons 508 and a modified set of toolbar icons 510. The second state is one in which a set of policies directed at restricting or limiting functionality of the mobile device 500 has been implemented resulting in the removal of predetermined icons from the display screen 502. As referenced above, the set of policies are directed to restricting or limiting functionality of a mobile device, which may include, for example, restricting use of certain applications on the mobile device in order to reduce distractions (e.g., weather, clock, messages, calendar, photos, camera, videos, etc.). As discussed above, the set of policies may be implemented by an application that is a component of the policy enforcement system and installed on the mobile device 500. Specifically, the set of policies may be implemented to remove icons from a mobile device's display screen when the mobile device is within a moving vehicle, and more specifically, the mobile device is determined by the policy enforcement system to be the driver's mobile device (or at least the closest mobile device to the driver). In some embodiments, the set of policies may be applied by the policy enforcement system of FIG. 1A to a plurality of networks devices, such as the network devices within a region incorporating the interior of a vehicle.

IV. Logical Representation—Policy Enforcement System

Figure 6A:
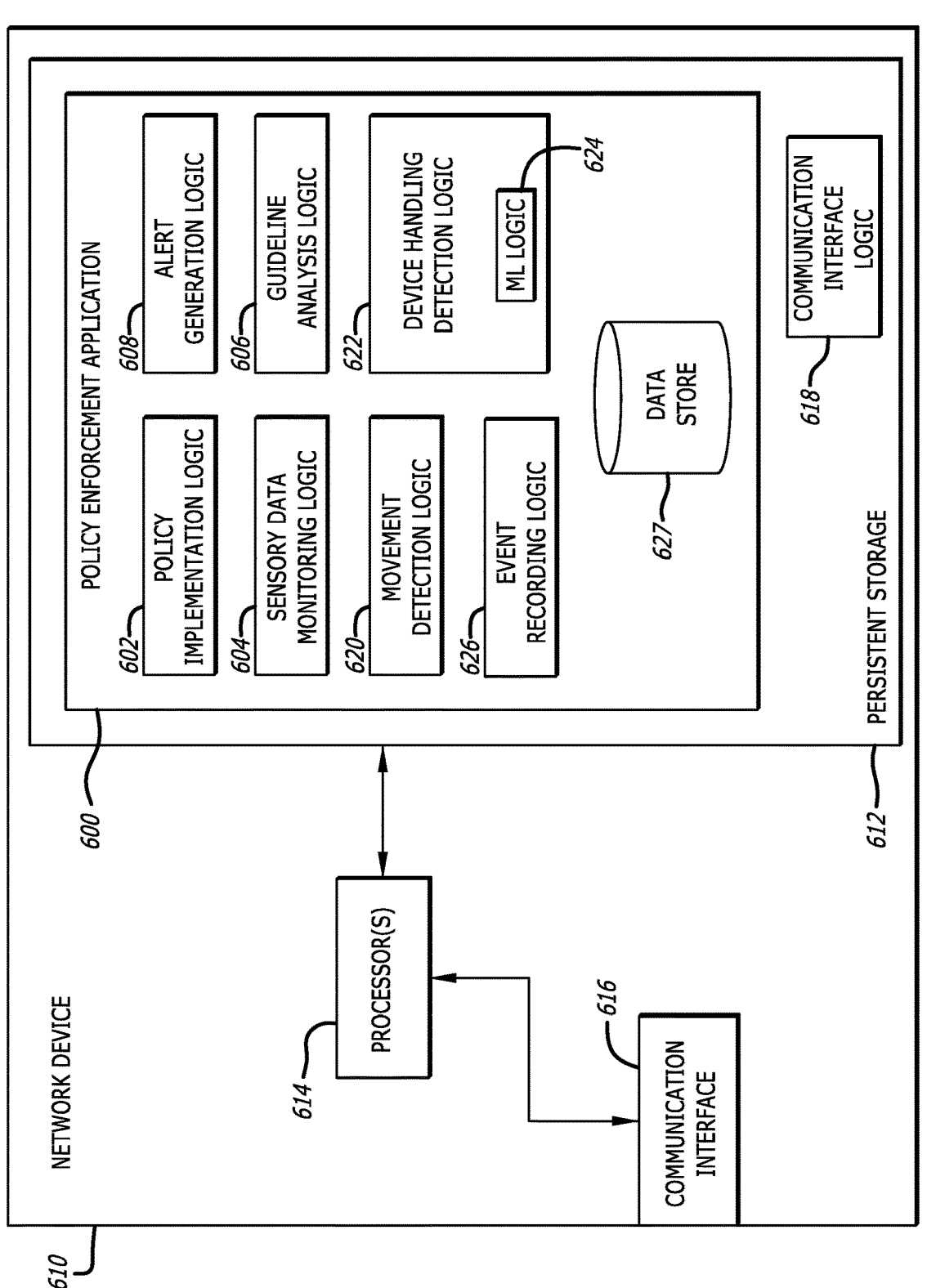
FIG. 6A is a first exemplary embodiment of a logical representation of a policy enforcement system application of FIG. 1A.

Referring now to FIG. 6A, an exemplary embodiment of a logical representation of the policy enforcement system application of FIG. 1A is shown. The policy enforcement system application 600 (which may be referred to throughout the disclosure as "the application"), in one embodiment, may be stored on a non-transitory computer-readable storage medium of a network device that includes a housing, which is made entirely or partially of a hardened material (e.g., hardened plastic, metal, glass, composite or any combination thereof) that protects the circuitry within the housing, namely one or more processor(s) 614 that are coupled to a communication interface 616 via a first transmission medium. The communication interface 616, under control by a communication interface logic 618, enables communications with external network devices, such as the wireless transceiver 104 of FIGS. 1A-1C. According to one embodiment of the disclosure, the communication interface 616 may be implemented as a physical interface including one or more ports for wired connectors. Additionally, or in the alternative, the communication interface 616 may be implemented with one or more radio units for supporting wireless communications with other electronic devices. The communication interface logic 618 may perform operations of receiving and transmitting electronic data via the communication interface 616 to enable communications between the policy enforcement system application 600 and network devices via a network (e.g., the internet) and/or cloud computing services.

The processor(s) 614 are further coupled to a persistent storage 612 via a second transmission medium. According to one embodiment of the disclosure, the policy enforcement application 600 may be stored in the persistent storage 612 and include some or all of the following components: a policy implementation logic 602, a sensory data monitoring logic 604, a guideline analysis logic 606, an alert generation logic 608, a movement detection logic 620, a device handling detection logic 622 (which includes a machine learning (ML) logic 624), an event recording logic 626 and an event data store 627 for storing resultant scores and/or detected events. The communication interface logic 618 may also be stored in the persistent storage 612. Of course, when implemented as hardware, one or more of these logic units could be implemented separately from each other. In addition, the following data stores, although not illustrated, may be stored locally with respect to the network device 610 and accessible to the policy enforcement application 600: a driver/vehicle guideline data store (DS), a policy configuration DS, a sensory data DS and an alert DS. In some embodiments, one or more of the data stores may be stored remotely and accessible to the policy enforcement application 600. Of course, one or more of the data stores may be implemented together.

According to some embodiments, the policy implementation logic 602 may, upon execution of the processors 614, perform or cause performance of operations including receiving policy configurations from the enforcement policy server system and implementing a set of policies (e.g., provided in the policy configuration), which may include restricting or limiting certain functionality of the network device 610. Various methods or manners of restricting or limiting functionality are discussed above. When a policy violation occurs, the policy implementation logic 602 may provide a signal or other indication to the alert generation logic 608, which is configured to generate alerts.

The sensory data monitoring logic 604 may, upon execution of the processors 614, perform or cause performance of operations including monitoring the handling of and operations performed to/by the network device 610, which may be according to the implemented set of policies and/or driver/vehicle guidelines. The sensory data monitoring logic 604 may provide detected or monitored data to the policy implementation logic 602 for analysis against the implemented set of policies.

The guideline analysis logic 606 may, upon execution of the processors 614, perform or cause performance of operations including analyzing data that is detected or monitored by the sensory data monitoring logic 604 against a set of predetermined driver/vehicle guidelines. The guideline analysis logic 606 may provide a signal or other indication to the alert generation logic 608 when a guideline violation has occurred.

Further, the alert generation logic 608 may, upon execution of the processors 614, perform or cause performance of operations including generating alerts and/or messages to be transmitted to the wireless transceiver and/or the policy enforcement server system, which may in turn generate an alert to be provided to an administrator as discussed above. Additionally, in some embodiments, the policy enforcement server system may merely forward the alert from the alert generation logic 608 to the administrator (or others registered to receive alerts).

The movement detection logic 620 may, upon execution by the processors 614, perform or cause performance of operations including obtaining data that indicates a speed that the network is traveling and performs a comparison between the data that indicates a speed and a predetermined speed threshold. As one example, the data that indicates a speed may be data from a GPS unit. In some embodiments, the predetermined speed threshold may be 5 miles per hour (mph). In other embodiments, the predetermined speed threshold may be 15 mph. However, it should be understood that these are merely illustrative examples and that other thresholds may be utilized. Further, the predetermined speed threshold may be altered (e.g., through updates to the policy enforcement application 600).

The device handling detection logic 622 may, upon execution of the processors 614, perform or cause performance of operations including utilization of machine learning (ML) techniques such as scoring of input by one or more trained ML models included within the ML logic 624. As will be described below, a trained ML model of the ML logic 624 takes X/Y/Z position data and acceleration data as input and scores the input to determine a resultant score that indicates whether the input corresponds to a device handling event. Additionally, the same ML model referenced above or a second ML model may take X/Y/Z position data and acceleration data as input and score the input to determine a resultant score that indicates a type of device handling event to which the input corresponds.

The event recording logic 626 may, upon execution of the processors 614, perform or cause performance of operations including recording information pertaining to a motion event and/or a device handling event in, for example, a database, datastore or a log file. As used herein, the term "motion event" may refer to a change in the X/Y/Z position of a network device and/or a detected acceleration of the network device. The information pertaining to the motion event may include a date-timestamp as well as X/Y/Z position data obtained from the gyroscope of the network device and acceleration data obtained from the accelerometer of the network device. In some instances, the X/Y/Z position and acceleration data for a time range may be recorded (e.g., for a time period surrounding an initial change in the X/Y/Z position data). It should be understood that reference to a change in the X/Y/Z position (or position data) may refer to a change in a rotation value for any of the X-, Y- and/or Z-axis. Similarly, the recorded information pertaining to a device handling event may include the information recorded for a motion event and optionally an identified type of device handling (e.g., phone call, texting, emailing, web surfing, camera usage, social media application usage, etc.).

Figure 6B:
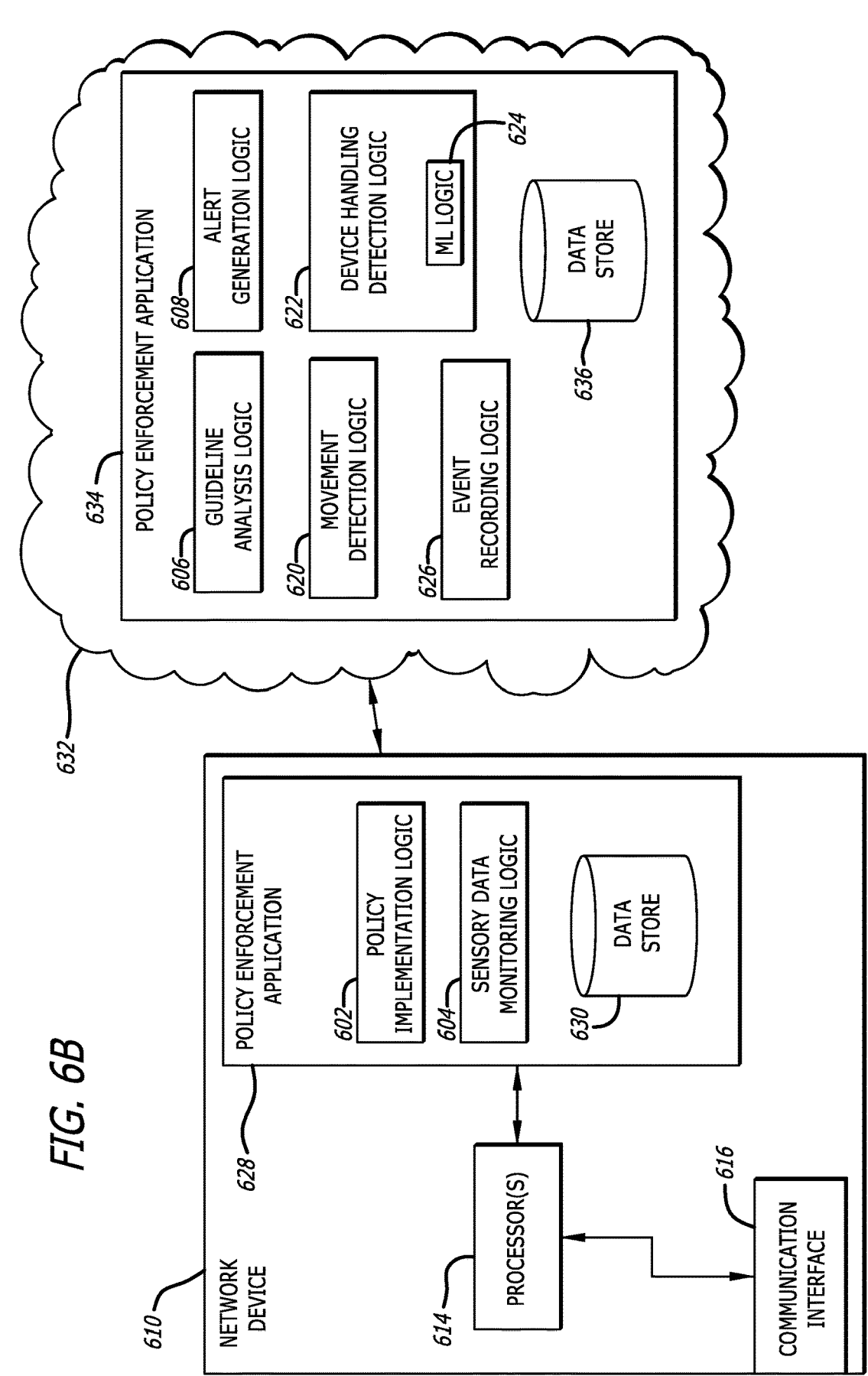
FIG. 6B is a second exemplary embodiment of a logical representation of a policy enforcement system application of FIG. 1A in which a portion is implemented in cloud-computing resources.

Referring to FIG. 6B, a second exemplary embodiment of a logical representation of a policy enforcement system application of FIG. 1A in which a portion is implemented in cloud-computing resources 632 is shown in accordance with some embodiments. FIG. 6B represents an alternative embodiment to that of FIG. 6A such that a first portion of the logic modules comprising the policy enforcement application 600 operate on the network device 610 (policy enforcement logic 628) and a second portion of the logic modules comprising the policy enforcement application 600 operate on the cloud computing resources 632 (policy enforcement logic 634). As shown, the policy enforcement logic 628 includes at least the policy implementation logic 602, the sensory data monitoring logic 604 and a data store 630 for storing telemetry data including X/Y/Z position data and acceleration data for transmission to the policy enforcement logic 634. The policy enforcement logic 634 includes movement detection logic 620, the alert generation logic 608, the guideline analysis logic 606, the device handling detection logic 622, the event recording logic 626 and a data store 636 for storing detected events and/or resultant scores.

The embodiment of FIG. 6B may operate with the policy enforcement logic 628 collecting data such as X/Y/Z position data obtained from the gyroscope of the network device 610 and the acceleration data obtained from the accelerometer of the network device 610 while the network device 610 is traveling within a vehicle. The collected data may then be transmitted to the policy enforcement logic 634 at a subsequent time, such as when the network device 610 no longer detects movement above the speed threshold for a specified amount of time (e.g., indicating travel within the vehicle has ended) or when the network device 610 connects to a wireless network.

As not all operations performed by the policy enforcement application 600 have been enumerated and discussed with respect to FIGS. 6A-6B, it should be understood that the disclosure above regarding operations performed by the policy enforcement application 600 may be performed by one or more of the logic modules illustrated in FIGS. 6A-6B.

V. Device Handling Event Detection

Figure 7A:
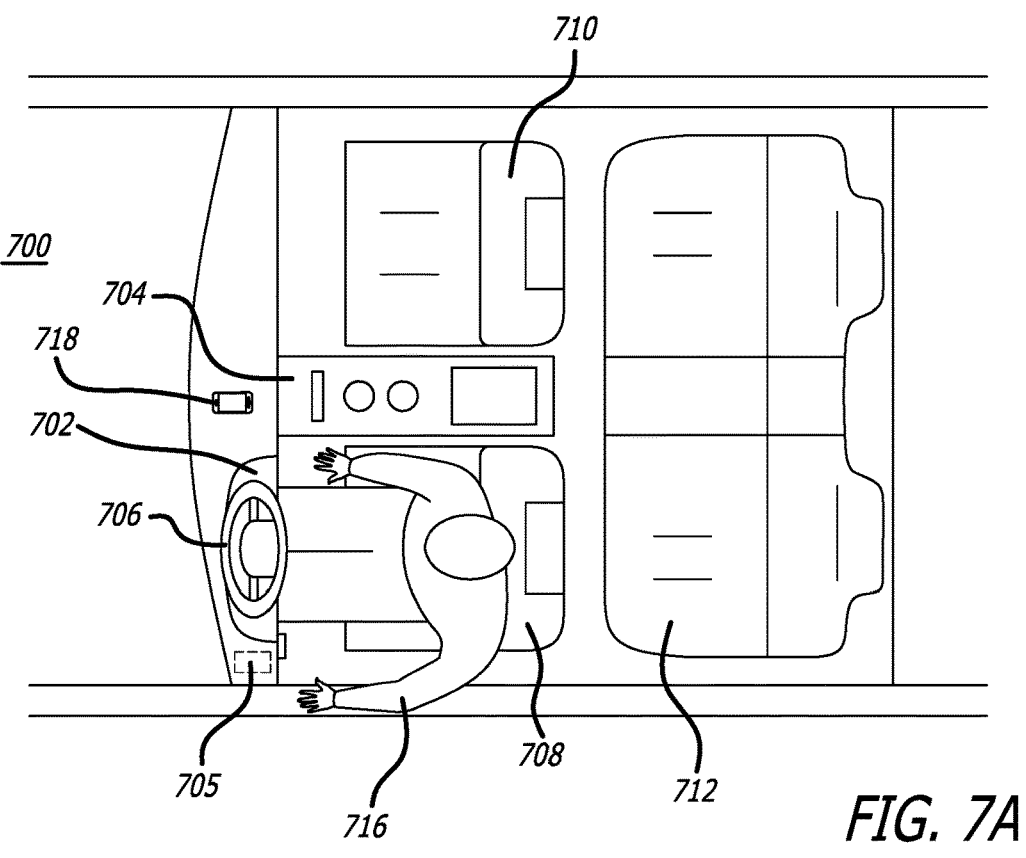
FIG. 7A is a first exemplary illustration of an interior cabin of a vehicle including a wireless transceiver installed therein.
Figure 7B:
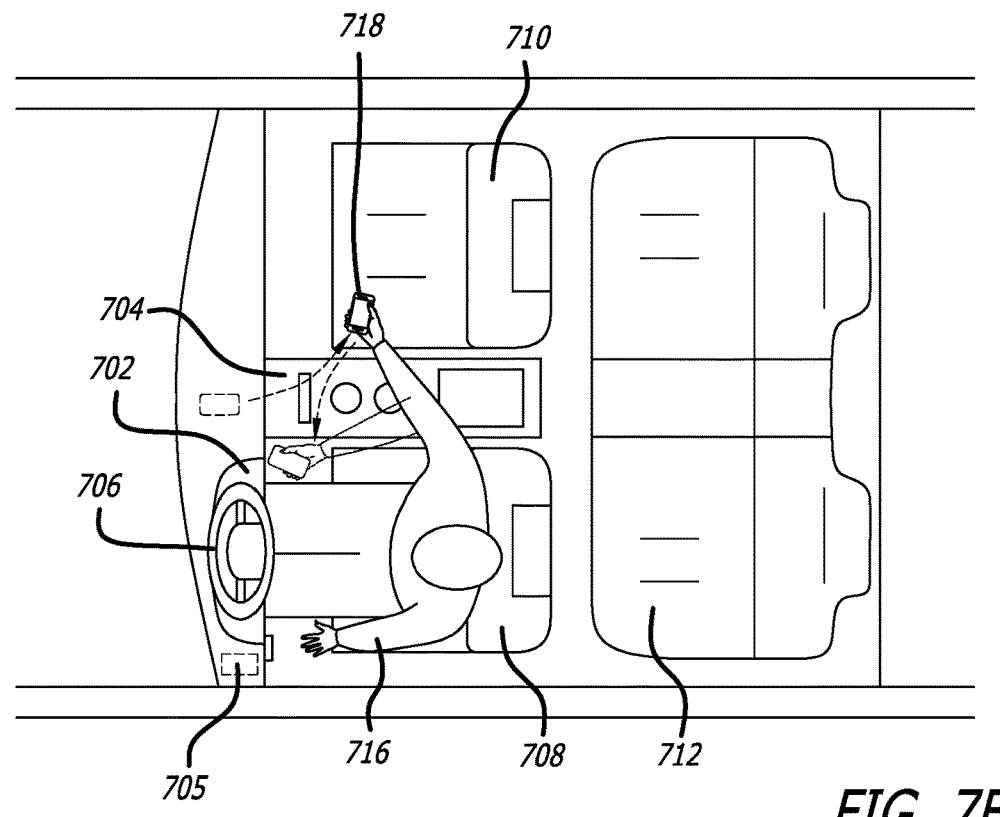
FIG. 7B is a second exemplary illustration of an interior cabin of the vehicle of FIGS. 6A-6B including the wireless transceiver installed therein.
Figure 7C:
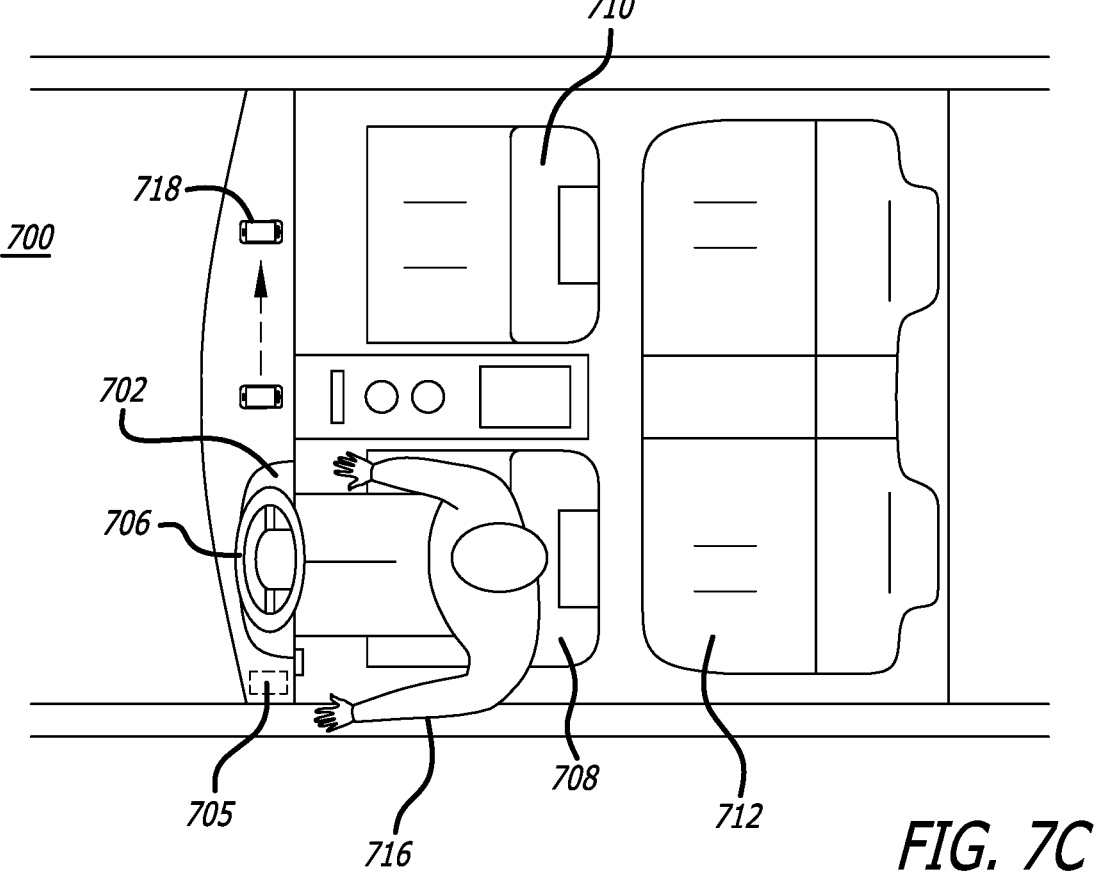
FIG. 7C is a third exemplary illustration of an interior cabin of the vehicle of FIGS. 6A-6B including the wireless transceiver installed therein.

Referring to FIGS. 7A-7C, a plurality of illustrations provide a visual demonstration of a network device 718 undergoing motion events within an interior cabin of a vehicle 700. The vehicle 700, as shown, includes the wireless transceiver being affixed to a portion of the interior cabin, such as the interior of the windshield. The placement of the wireless transceiver may vary slightly depending on the make and model of the vehicle and physical structure of the wireless transceiver. For example, the wireless transceiver may be affixed to a portion of the dashboard (e.g., behind the steering wheel or to the left of the steering wheel from the perspective of the driver). In some embodiments, the wireless transceiver 705 may be integrated into a dashboard 702 or a steering wheel 706.

As illustrated in FIG. 7A, a driver 716 is shown, sitting in the driver's seat 708 while a network device 718 is disposed on the dashboard 702. The vehicle 700 includes the center console 704, a front passenger's seat 710 and a backseat 712 (as should be understood, the vehicle 700 may be configured differently depending on the make and model). The driver 716 may be operating the vehicle 700 while traveling above the speed threshold. As discussed above, following download and installation of the software application on the network device 718, a configuration process is undertaken that configures the software application for use with the wireless transceiver 705.

As illustrated in FIG. 7A, the network device 718 is located in a first position (e.g., on the dashboard 702). However, the first position may vary such that the network device 718 is located within a cup holder of the center console 704 or glove box, within a clothing pocket of the driver or the like. The policy enforcement application may be configured to detect and record the first position of the network device 718 using the gyroscope of the network device 718 to detect the X/Y/Z position of the network device 718.

As illustrated in FIG. 7B, the network device 718 undergoes a motion event, wherein the network device 718 is moved from the first position to a second position. As indicated in FIG. 7B, the motion event occurs when the driver 716 moves the network device 718 from the first position to the second position. The policy enforcement application is configured to detect the position change of the network device 718 from the first position to the second position using the gyroscope of the network device 718. The policy enforcement application may be configured to detect other parameters (e.g., acceleration of the device) of the network device 718 to classify the motion event as a network device handling event, that will be described in more detail below. It can be appreciated that the network device 718 may move from the first position to the second position without being handled by the driver 716 (e.g., vehicle 700 traveling over train tracks, the network device 718 sliding along the dashboard 702 or the like).

As illustrated in FIG. 7C, the network device 718 is located in a first position on the dashboard 702. FIG. 7C illustrates the network device 718 undergoing a motion event different from that of FIG. 7B where the network device 718 moves from a first position to a third position, which may be located on the dashboard 702 distal the first position. It may be understood that the motion event illustrated by FIG. 7C does not require handling of the network device 718 by the driver. Based on execution of device handling detection logic, the policy enforcement application may be configured to determine the difference between a motion event that classifies as a network device handling event and a motion event that does not classify as a network device handling event. It can be appreciated that the policy enforcement application may be configured to detect motion events of additional network devices 718 (e.g., from passengers occupying the front passenger's seat 710 or the backseat 712).

VI. Operational Flows

Figure 9B:
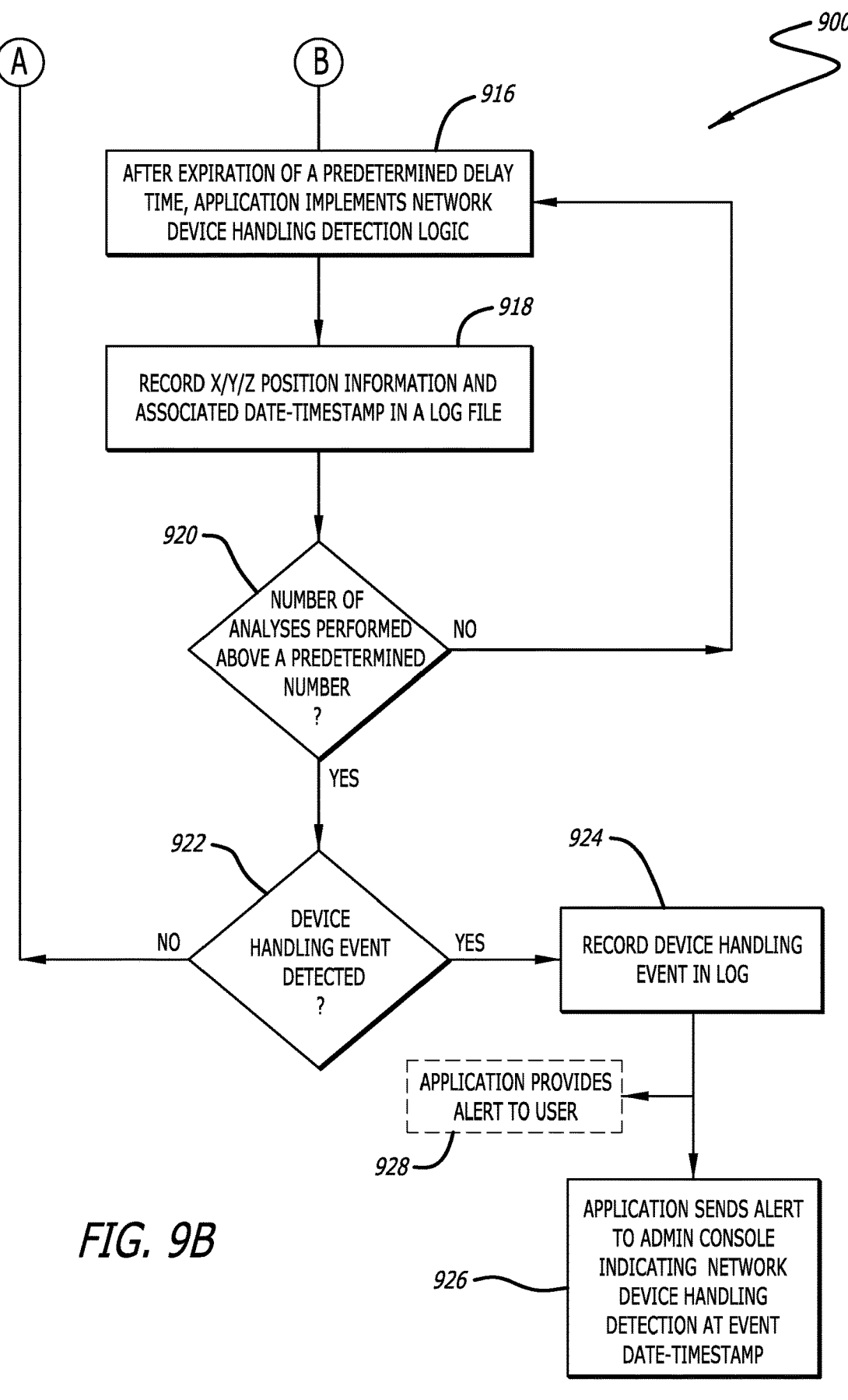

As a precursor to the discussion of the methods 800 and 900 of FIGS. 8 and 9A-9B, upon detection of the presence of a transceiver, a network device having the policy enforcement application operating thereon attempts to connect to the transceiver. Upon connecting, the transceiver may record the RSSI value of a communication (such as an advertisement packet) received from the network device. A response communication from the transceiver to the network device may include the RSSI value, which may be referred to therein as the "RSSI value of the network device," where the RSSI value of the network device corresponds to the signal strength of a packet transmitted by the network device to the transceiver, which is indicative of the physical proximity of the network device to the transceiver.

FIG. 8 illustrates a flowchart of an exemplary method of detecting a device handling event through machine learning techniques by the policy enforcement application of FIGS. 6A-6B. Each block illustrated in FIG. 8 represents an operation performed in the method 800 of detecting a device handling event through machine learning techniques. Prior to performance of the operations of the method 800, it may be assumed that a network device having an instance of the policy enforcement application 600 ("the policy enforcement application") operating thereon is located within a vehicle. It may be further assumed that a transceiver, such as the transceiver 104 of FIG. 1, is also located within the vehicle. Specifically, the transceiver may be affixed to an upper left corner, a lower left corner or generally the left side of the vehicle's windshield relative to the driver's perspective. In other embodiments, the transceiver may be affixed to the dashboard behind the steering wheel or otherwise in line with a driver's seat. In yet other examples, the transceiver may be affixed to the ceiling of the vehicle above the steering wheel or the driver's seat.

Thus, the method 800 commences when the policy enforcement application detects movement above a predetermined speed threshold and further detects the presence of a transceiver, such as the transceiver 104 of FIG. 1A (block 802). As noted above, detection of speed above the speed threshold in combination with the presence of the transceiver may result in application of a set of policies configured to restrict or limit the use of the network device.

Responsive to detecting movement above the speed threshold, the policy enforcement application records the X/Y/Z positioning of the network device thereby establishing a position baseline of the network device (block 804). The position baseline allows the policy enforcement application to detect deviation of the network device from the position baseline. The policy enforcement application detects the network device's X/Y/Z position using the network device's gyroscope. The gyroscope of the network device may provide rotation values for each of an X-, Y- and Z-axis (referred to as X/Y/Z position data) to the policy enforcement application. The network device's X/Y/Z position may include the pitch, the roll and the yaw of the network device.

In some embodiments, the position baseline may be in constant shift with the policy enforcement application configured to detect movement of the network device when the network device is above the predetermined speed threshold. Stated otherwise, the policy enforcement application may obtain the X/Y/X position of the network device at regular intervals to update the baseline position of the network device over time. For example, the network device may be initially placed in the middle of the front passenger seat; however, due to typical movements of the vehicle such as turns, sudden stops, accelerations, etc., the position of the network device may inadvertently shift slightly. Thus, by updating the baseline position of the network device over time (e.g., at regular intervals such as of 10, 20, 30 seconds, etc.), the motion event detection method may be more accurate than using a single baseline position for the entirety of the vehicle's trip. More specifically, updating the baseline position of the network device reduces false positives in detecting motion events.

The method 800 further includes the policy enforcement application detecting a position change (at least one of the X/Y/Z positions) and an acceleration of the network device (block 806). In some embodiments, the movement detection logic 620 of the policy enforcement application detects the position change by monitoring data obtained or detected by the gyroscope of the network device and the acceleration change by monitoring data obtained or detected by the network device's accelerometer. The accelerometer of the network device may provide to the policy enforcement application a numerical value including the direction of the acceleration of the network device. In some embodiments, the policy enforcement application continues with the method 800 when the position change satisfies a X/Y/Z position change threshold and the acceleration change satisfies an acceleration threshold. Stated otherwise, when the change in the X/Y/Z position or the acceleration does not satisfy the respective threshold, the method 800 does not continue to the operation of block 808. In some embodiments, the X/Y/Z position threshold and the acceleration threshold may be predetermined. For instance, the X/Y/Z position and acceleration thresholds may be configurable parameters of the policy enforcement application.

Responsive to detecting a position change and acceleration of the network device with each satisfying the respective threshold, the device handling detection logic 622 is implemented utilizing the machine learning (ML) logic 624 to determine whether the X/Y/Z position change and the acceleration correspond to a device handling event (block 808). As discussed in further detail below, the ML logic 624 may include a trained ML model that receives as input the X/Y/Z position change (e.g., position baseline and detected X/Y/Z position that differs from the position baseline, a numeral indication of an amount of change, a percentage change, etc.) and the acceleration over a predetermined amount of time surrounding the detection of the X/Y/Z position change. For example, the X/Y/Z position change data and the acceleration data encompassing a predetermined number of seconds (e.g., 3, 5, 10, 15, etc.) prior to and following the time that the X/Y/Z position change was initially detected may be provided to the ML model. The ML model then scores the X/Y/Z position change data and acceleration data, where the resultant score indicates whether the X/Y/Z position change data and acceleration data corresponds to a device handling event (e.g., the network device was picked up and handled by a user) or merely corresponds to movement of the network device that may be caused by events such as hard turns, hard breaking, driving over speed bumps or depressions in the road, etc.

Following detection of a device handling event, the policy enforcement application may optionally identify, through utilization of the ML logic 624, a type of device handling event that was detected (block 810). In some instances, the ML model referenced above may further score the input and provide a resultant score that indicates a type of device handling event. In such instances, training of the ML model may include use of signatures for each type of device handling event, where each signature is formed from historical data. In other instances, a ML model may score the input and provide a resultant score that indicates a type of device handling event.

Following analysis of the X/Y/Z position data and acceleration by the device handling detection logic 622, the motion event of the network device is either classified as a device handling event and an alert is generated or, optionally, the baseline position of the network device is updated (block 812).

Referring to FIGS. 9A-9B, a flowchart illustrating an exemplary method 900 of applying and monitoring a set of policies by the policy enforcement system of FIG. 1A to detect a device handling event is shown. Each block illustrated in FIGS. 9A-9B represents an operation performed in the method 900 of detecting a device handling event. The method 900 includes the policy enforcement application running on the network device detecting the presence of a transceiver and movement of the network device above a predetermined speed threshold (block 902). For example, in an automobile piloted by a driver, the predetermined speed threshold may be 15 miles per hour.

In response to the policy enforcement application detecting the transceiver and movement of the network device above the speed threshold, the policy enforcement application records the X/Y/Z position of the network device from the device gyroscope to establish a baseline position (block 904). For instance, the policy enforcement application may record numerical values associated with the X/Y/Z position of the network device.

Subsequent to establishment of a baseline position, the policy enforcement application detects a motion event of the network device (block 906). A motion event may include any change in the X/Y/Z position of the network device. As will be discussed in further detail below, the method 900 seeks to determine whether the change in the X/Y/Z position is a result of a user handling the network device (e.g., in an attempt to utilize a feature of the device) or is merely a result of alternative action such as hard breaking, hard turning, passing over a speedbump or a depression in the road, etc.

Following the detection of a motion event, the movement detection logic 620 may determine whether the change in the X/Y/Z position differs from the baseline position by at least a threshold amount (block 908). When the change is less than a threshold amount, no alert is generated (block 910). Additionally, the baseline position may be updated to the new X/Y/Z position. When the change is at least the threshold amount, the movement detection logic 620 determines whether the accelerometer detected an acceleration corresponding to the change in the X/Y/Z position (block 912). When there was no acceleration, no alert is generated (block 910). Additionally, the baseline position may be updated to the new X/Y/Z position. However, when the change of at least one of the X/Y/Z positions is at least the threshold amount and acceleration is detected, the policy enforcement application records a date-timestamp of the motion event (block 914).

With reference now to FIG. 9B, the method 900 may pause for a delay time prior to implementation of the device handling detection logic 622 (block 916). The device handling detection logic 622 includes the ML logic 624, which as noted above, may include one or more trained ML models. In one embodiment, a trained ML model receives as input the X/Y/Z position of the network device and its acceleration for a given time period surrounding the detection of the X/Y/Z movement. The ML model then scores the input and provides a resultant score that indicates whether the X/Y/Z movement and acceleration correspond to a device handling event. In some instances, the same ML model (or a second ML model) may score the X/Y/Z position of the network device and its acceleration and provide a resultant score indicating a type of device handling event. Following the scoring (an analysis), the X/Y/Z position information and associated date-timestamp are recorded and a determination in made as to whether a predetermined number of analyses have been made (blocks 918-920). When the predetermined number of analysis have not been made, the method 900 returns to block 916 to continue scoring X/Y/Z position data and acceleration data.

In some embodiments, only a single analysis may be performed prior to the method 900 continuing to block 922. However, in embodiments in which multiple rounds of analyses are performed, scoring of the X/Y/Z position data and acceleration data is performed over a timespan that expands with each round due to the time delay in block 916. Thus, by performing multiple rounds of analyses, the ML model provides a more accurate scoring due to the increased amount of data analyzed as opposed to when a single round of scoring is performed.

When the predetermined number of analyses has been performed, the device handling detection logic 622 determines whether the one or more resultant scores (resultant scores) of the ML processing indicate that the motion event is a device handling event (block 922). When the resultant scores do not indicate that a device handling event occurred, no alert is generated and, optionally, the baseline position may be updated to the X/Y/Z position change detected at any of blocks 906 or 918 (block 910). When a device handling event is determined to have occurred, the device handling event is recorded and alerts may be provided to the user and an administrator (blocks 924, 926, 928).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method for identification of a type of a motion event of a network device, the method comprising:
   establishing a position baseline of the network device, wherein establishing the position baseline of the network device includes recording a value for each of an X-, Y- and Z-axis detected by a gyroscope of the network device;
   detecting the motion event of the network device, wherein detecting the motion event includes detecting a position change by the gyroscope or an acceleration by an accelerometer of the network device;
   evaluating the detected position change or the detected acceleration of the network device as an input to a machine learning model that is configured to generate a resultant score;
   identifying a type of motion event wherein the motion event is selected from the group consisting of a dropping event, a shaking event, or a displacement event corresponding to the motion event based on the resultant score of the evaluating by the machine learning model; and
   classifying the type of motion event as a network device handling event or a non-network device handling event.

2. The method of claim 1, further comprising:
   implementing a set of policies on the network device in response to the motion event being classified as the network device handling event, wherein implementation of the set of policies is configured to restrict functionality of the network device according to a predefined list of functionalities.

3. The method of claim 1, wherein detecting the motion event includes detecting a change in the value for at least one of the X-, Y- or Z-axis detected by a gyroscope of the network device, and
   wherein evaluating the detected position change or acceleration of the network device includes evaluating the detected change in the value for at least one of the X-, Y- or Z-axis by the machine learning model.

4. The method of claim 1, wherein evaluating the detected change in the value for at least one of the X-, Y- or Z-axis by the machine learning model includes scoring of input by the machine learning model, wherein the input includes at least an indication of a difference between the position baseline and the rotation value for at least one of the X-, Y- or Z-axis detected by the gyroscope of the network device.

5. The method of claim 4, wherein the scoring indicates that the type of motion event was a handling of the network device by a user.

6. The method of claim 4, wherein the scoring indicates that the type of motion event was a movement of the network device due to movement of a vehicle in which the network device is located.

7. The method of claim 1, wherein the machine learning model is trained using a plurality of motion event signatures.

8. A non-transitory computer readable storage medium having stored thereon instructions that, when executed by one or more processors, cause performance of operations comprising:
   establishing a position baseline of a network device, wherein establishing the position baseline of the network device includes recording a value for each of an X-, Y- and Z-axis detected by a gyroscope of the network device;
   detecting the motion event of the network device, wherein detecting the motion event includes detecting a position change by the gyroscope or an acceleration by an accelerometer of the network device;
   evaluating the detected position change or the detected acceleration of the network device as an input to a machine learning model that is configured to generate a resultant score;
   identifying a type of motion event wherein the motion event is selected from the group consisting of a dropping event, a shaking event, or a displacement event corresponding to the motion event based on the resultant score of the evaluating by the machine learning model; and
   classifying the type of motion event as a network device handling event or a non-network device handling event.

9. The non-transitory computer readable storage medium of claim 8, wherein the operations further comprise:
   implementing a set of policies on the network device in response to the motion event being classified as the network device handling event, wherein implementation of the set of policies is configured to restrict functionality of the network device according to a predefined list of functionalities.

10. The non-transitory computer readable storage medium of claim 8, wherein detecting the motion event includes detecting a change in the value for at least one of the X-, Y- or Z-axis detected by a gyroscope of the network device, and
   wherein evaluating the detected position change or acceleration of the network device includes evaluating the detected change in the value for at least one of the X-, Y- or Z-axis by the machine learning model.

11. The non-transitory computer readable storage medium of claim 8, wherein evaluating the detected change in the value for at least one of the X-, Y- or Z-axis by the machine learning model includes scoring of input by the machine learning model, wherein the input includes at least an indication of a difference between the position baseline and the rotation value for at least one of the X-, Y- or Z-axis detected by the gyroscope of the network device.

12. The non-transitory computer readable storage medium of claim 11, wherein the scoring indicates that the type of motion event was a handling of the network device by a user.

13. The non-transitory computer readable storage medium of claim 11, wherein the scoring indicates that the type of motion event was a movement of the network device due to movement of a vehicle in which the network device is located.

14. The non-transitory computer readable storage medium of claim 8, wherein the machine learning model is trained using a plurality of motion event signatures.

15. A system for determining a motion event of a network device, the system comprising:

a memory to store executable instructions; and a processing device coupled with the memory, wherein the executable instructions, when executed by the processing device, cause operations including:

establishing a position baseline of the network device, wherein establishing the position baseline of the network device includes recording a value for each of an X-, Y- and Z-axis detected by a gyroscope of the network device, detecting the motion event of the network device, wherein detecting the motion event includes detecting a position change by the gyroscope or an acceleration by an accelerometer of the network device;

evaluating the detected position change or the detected acceleration of the network device as an input to a machine learning model that is configured to generate a resultant score, identifying a type of motion event wherein the motion event is selected from the group consisting of a dropping event, a shaking event, or a displacement event corresponding to the motion event based on the resultant score of the evaluating by the machine learning model, and classifying the type of motion event as a network device handling event or a non-network device handling event.

16. The system of claim 15, wherein the operations further include:

implementing a set of policies on the network device in response to the motion event being classified as the network device handling event, wherein implementation of the set of policies is configured to restrict functionality of the network device according to a predefined list of functionalities.

17. The system of claim 15, wherein detecting the motion event includes detecting a change in the value for at least one of the X-, Y- or Z-axis detected by a gyroscope of the network device, and wherein evaluating the detected position change or acceleration of the network device includes evaluating the detected change in the value for at least one of the X-, Y- or Z-axis by the machine learning model.

18. The system of claim 15, wherein evaluating the detected change in the value for at least one of the X-, Y- or Z-axis by the machine learning model includes scoring of input by the machine learning model, wherein the input includes at least an indication of a difference between the position baseline and the rotation value for at least one of the X-, Y- or Z-axis detected by the gyroscope of the network device.

19. The system of claim 15, wherein the scoring indicates that the type of motion event was a handling of the network device by a user.

20. The system of claim 15, wherein the machine learning model is trained using a plurality of motion event signatures.

\* \* \* \* \*